US010997073B2

(12) United States Patent
Lee et al.

(10) Patent No.: US 10,997,073 B2
(45) Date of Patent: May 4, 2021

(54) MEMORY SYSTEM

(71) Applicant: SK hynix Inc., Gyeonggi-do (KR)

(72) Inventors: Dong Ju Lee, Seoul (KR); Dae Hong Kim, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 7 days.

(21) Appl. No.: 16/688,259

(22) Filed: Nov. 19, 2019

(65) Prior Publication Data
US 2020/0409845 A1    Dec. 31, 2020

(30) Foreign Application Priority Data
Jun. 25, 2019   (KR) ........................ 10-2019-0075467

(51) Int. Cl.
G06F 12/00       (2006.01)
G06F 12/0804   (2016.01)
G06F 12/10       (2016.01)

(52) U.S. Cl.
CPC .......... *G06F 12/0804* (2013.01); *G06F 12/10* (2013.01); *G06F 2212/1044* (2013.01); *G06F 2212/657* (2013.01)

(58) Field of Classification Search
CPC ................ G06F 12/0804; G06F 12/10; G06F 2212/1044; G06F 2212/657
See application file for complete search history.

(56) References Cited

U.S. PATENT DOCUMENTS 9,170,932  B1 * 10/2015  Lo ....................... G06F 12/0246
9,875,038  B2 *  1/2018  Jang ................... G06F 12/0246
2010/0115186 A1 *  5/2010  Chang ................ G06F 12/0246
                                                                                 711/103
2011/0296123 A1 * 12/2011  Adler ................. G11C 14/0018
                                                                                 711/156
2012/0203958 A1 *  8/2012  Jones .................. G06F 12/0246
                                                                                 711/103
2013/0091320 A1 *  4/2013  Kawamura ........... G06F 3/0619
                                                                                 711/103
2016/0378359 A1 * 12/2016  Jang .................... G06F 12/0246
                                                                                 711/118
2017/0046185 A1 *  2/2017  Tsirkin .............. G06F 9/45558
2018/0095680 A1 *  4/2018  Peterson .............. G06F 3/0619
2018/0357164 A1 * 12/2018  Lee ..................... G06F 12/1009
2020/0019322 A1 *  1/2020  Qiang .................. G06F 3/0634

FOREIGN PATENT DOCUMENTS

KR    10-2011-0016320    2/2011
KR    10-2014-0042430    4/2014

* cited by examiner

*Primary Examiner* — John A Lane
(74) *Attorney, Agent, or Firm* — IP & T Group LLP

(57) ABSTRACT

A memory system capable of efficiently managing meta data is provided. The memory system includes a non-volatile memory device for storing a plurality of map segment groups each including map segments including mapping information between at least one physical addresses and at least one logical address of a host; and a controller for loading one map segment from each of selected map segment groups among the plurality of map segment groups, and differently configuring flush data to be flushed to the non-volatile memory device in response to a program request that includes a first target logical address received from the host according to whether a target map segment corresponding to the first target logical address is in the loaded one map segment.

20 Claims, 18 Drawing Sheets

MEMORY SYSTEM

CROSS-REFERENCE TO RELATED APPLICATION

The present application claims priority under 35 U.S.C. § 119(a) to Korean patent application number 10-2019-0075467, filed on Jun. 25, 2019, which is incorporated herein by reference in its entirety.

BACKGROUND

Field of Invention

The present disclosure generally relates to a memory system, and more particularly, to a memory system capable of efficiently managing meta data.

Description of Related Art

A memory system may include a memory controller and a non-volatile memory device.

When a program request including a logical address and data are received from a host, the memory controller may allocate a physical address corresponding to the received logical address, and control the non-volatile memory device such that the data is stored at the allocated physical address.

The memory controller may manage mapping information between a physical address at which data is stored and a logical address corresponding to the physical address.

SUMMARY

Embodiments provide a memory system capable of managing large-capacity meta data with a small memory capacity.

In accordance with an aspect of the present disclosure, there is provided a memory system including a non-volatile memory device configured to store a plurality of map segment groups each including map segments including mapping information between at least one physical address and at least one logical address of a host; and a controller configured to load one map segment from each of selected map segment groups among the plurality of map segment groups, and differently configure flush data to be flushed to the non-volatile memory device in response to a program request that includes a first target logical address received from the host according to whether a target map segment corresponding to the first target logical address is in the loaded one map segment.

In accordance with another aspect of the present disclosure, there is provided a memory system including a non-volatile memory device, into which map information and flush data are flushed, the map information including a physical address at which each of a plurality of map segments in each of a plurality of map segment groups is stored in the non-volatile memory device, and the flush data including a physical address at which a first map segment among the map segments is flushed; and a controller configured to load the map information, load the flush data flushed after the map information is flushed, and update the physical address, at which the first map segment in the loaded flush data is stored, in the loaded map information.

In accordance with another aspect of the present disclosure, there is provided an operating method of a controller for controlling a memory device storing plural map segment groups, the operating method comprising caching a segment from each of selected one or more among the groups; caching map information indicating the cached segments and physical addresses of segments within the respective groups; flushing first flush data including one or more journals each indicating change of one or more cache-hit segments; flushing second flush data including a victim segment among the cached segments and information of the victim segment and one or more neighbor segments of a target segment to replace the victim segment; caching the target segment and updating the cached map information; flushing third flush data including the cached map information upon flushing of the first and second flush data a set number of times; rebuilding, upon a power-on after a power-off, the map information by caching the flushed map information and referring to the second flush data, which is flushed after the third flush data before the power-off; and caching one or more segments with reference to the information of in the rebuilt map information and by sequentially replaying the journals included in the first flush data flushed after the flushing of the second flush data corresponding to the cached segments before the power-off, wherein the victim segment, the neighbor segments, and the target segment belong to the same group.

DETAILED DESCRIPTION

The specific structural and functional description disclosed herein is merely illustrative for the purpose of describing embodiments of the present invention. The invention can be implemented in various forms and ways, and thus is not limited to the embodiments set forth herein. Throughout the specification, reference to "an embodiment," "another embodiment" or the like is not necessarily to only one embodiment, and different references to any such phrase are not necessarily to the same embodiment(s).

Figure 1:
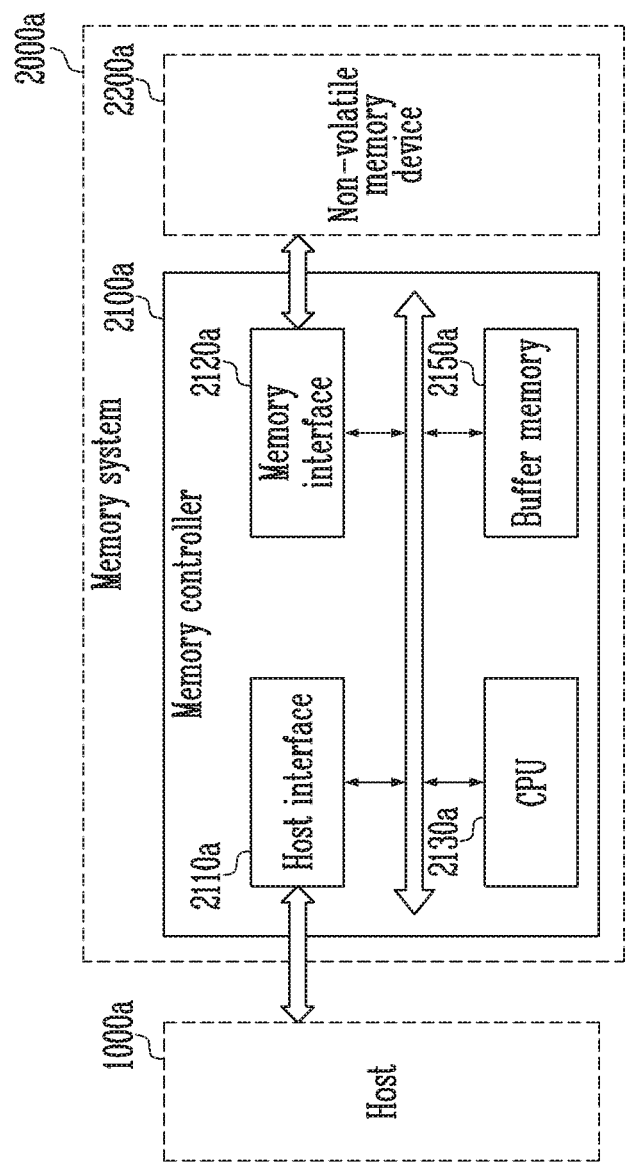
FIG. 1 is a diagram illustrating a memory system in accordance with an embodiment of the present disclosure.

FIG. 1 is a diagram illustrating a memory system in accordance with an embodiment of the present disclosure.

The memory system 2000a may include a non-volatile memory device 2200a configured to store data and a memory controller 2100a configured to control the non-volatile memory device 2200a in response to a request from a host 1000a.

The host 1000a may be a device or system configured to store data in the memory system 2000a or retrieve data from the memory system 2000a. For example, the host 1000a may include at least one of a computer, a portable digital device, a tablet, a digital camera, a digital audio player, a television, a wireless communication device, or a cellular phone, but embodiments of the present disclosure are not limited thereto.

The memory controller 2100a may control overall operations of the memory system 2000a. The memory controller 2100a may perform various operations in response to a request from the host 1000a. For example, the memory controller 2100a may perform a program operation, a read operation, an erase operation, and the like on the non-volatile memory device 2200a. In the program operation, the memory controller 2100a may transmit a program command, an address and data to the non-volatile memory device 2200a. In the read operation, the memory controller 2100a may transmit a read command and an address to the non-volatile memory device 2200a, and receive read data from the non-volatile memory device 2200a. In the erase operation, the memory controller 2100a may transmit an erase command and an address to the non-volatile memory device 2200a.

The non-volatile memory device 2200a may perform a program operation, a read operation, an erase operation, and the like under the control of the memory controller 2100a. For example, the non-volatile memory device 2200a may receive a program command, an address, and data from the memory controller 2100a, and store the data according to the program command and the address. For example, the non-volatile memory device 2200a may perform a read operation according to a read command and an address, which are received from the memory controller 2100a, and provide read data to the memory controller 2100a. For example, the non-volatile memory device 2200a may perform an erase operation according to an erase command and an address, which are received from the memory controller 2100a.

The memory controller 2100a may include a host interface 2110a, a memory interface 2120a, a central processing unit (CPU) 2130a, and a buffer memory 2150a. The host interface 2110a, the memory interface 2120a, and the buffer memory 2150a may be controlled by the CPU 2130a.

The host interface 2110a may transfer a program request, a read request, an erase request, and the like, which are received from the host 1000a, to the CPU 2130a. In a program operation, the host interface 2110a may receive data corresponding to the program request from the host 1000a, and store the received data in the buffer memory 2150a. In a read operation, the host interface 2110a may transmit read data stored in the buffer memory 2150a to the host 1000a. The host interface 2110a may perform communication with the host 1000a by using any of various interface protocols. For example, the host interface 2110a may communicate with the host 1000a by using at least one interface protocol among a Non-Volatile Memory express (NVMe), a Peripheral Component Interconnect-Express (PCI-E), an Advanced Technology Attachment (ATA), a Serial ATA (SATA), a Parallel ATA (PATA), a Universal Serial Bus (USB), a Multi-Media Card (MMC), an Enhanced Small Disk Interface (ESDI), an Integrated Drive Electronics (IDE), a Mobile Industry Processor Interface (MIPI), a Universal Flash Storage (UFS), a Small Computer System Interface (SCSI), or a Serial Attached SCSI (SAS). However, embodiments of the present disclosure are not limited thereto.

The memory interface 2120a may perform communication with the non-volatile memory device 2200a by using any of various interface protocols.

In a program operation, the memory interface 2120a may transmit, to the non-volatile memory device 2200a, a program command and an address, which are received from the CPU 2130a, and data stored in the buffer memory 2150a.

In a read operation, the memory interface 2120a may transmit a read command and an address, which are received from the CPU 2130a, to the non-volatile memory device 2200a. In the read operation, the memory interface 2120a may store read data received from the non-volatile memory device 2200a in the buffer memory 2150a, and notify the CPU 2130a that the read data has been received.

The CPU 2130a may perform various calculations or generate a command and an address so as to control the non-volatile memory device 2200a. For example, the CPU 2130a may generate various commands and various addresses, which are necessary for a program operation, a read operation, an erase operation, and the like, in response to a request transferred from the host interface 2110a.

When a program request is received from the host interface 2110a, the CPU 2130a may generate a program command and an address, and control the memory interface 2120a such that the generated program command, the generated address, and data stored in the buffer memory 2150a is transmitted to the non-volatile memory device 2200a.

When a read request is received from the host interface 2110a, the CPU 2130a may generate a read command and an address, and control the memory interface 2120a such that the generated read command and the generated address is transmitted to the non-volatile memory device 2200a. When the memory interface 2120a notifies the CPU 2130a that read data has been received, the CPU 2130a may control the host interface 2110a such that the read data stored in the buffer memory 2150a is transmitted to the host 1000a.

When an erase request is received from the host interface 2110a, the CPU 2130a may generate an erase command and an address, and control the memory interface 2120a such that the generated erase command and the generated address is transmitted to the non-volatile memory device 2200a.

The CPU 2130a may load various meta data for management of the memory system 2000a to the buffer memory 2150a, and update the loaded meta data in the buffer memory 2150a. The meta data may include, for example, at least one of an address mapping table, valid page information, or a program/erase count, but embodiments of the present disclosure are not limited thereto.

In a program operation, the CPU 2130a may allocate a physical address corresponding to a logical address included in a program request, and update an address mapping table including mapping information between logical addresses and physical addresses. Also, the CPU 2130a may program data received corresponding to the program request in a storage area corresponding to the allocated physical address.

In a read operation, the CPU 2130a may identify a physical address corresponding to a logical address included in a read request, with reference to the address mapping table, and receive read data by accessing a storage area corresponding to the identified physical address.

The CPU 2130a may load the address mapping table stored in the non-volatile memory device 2200a to the buffer memory 2150a, and update the address mapping table in the buffer memory 2150a.

The CPU 2130a may generate, as journal data, mapping information between logical and physical addresses, which is updated in the address mapping table loaded to the buffer memory 2150a, and flush the generated journal data to the non-volatile memory device 2200a.

In an embodiment, the CPU 2130a may load only a portion of the address mapping table stored in the non-volatile memory device 2200a to the buffer memory 2150a.

In an embodiment, the address mapping table may include a plurality of map segment groups. Each of the map segment groups may include a plurality of map segments, and map segments of the same map segment group may neighbor each other. Therefore, each map segment of the same segment group may be referred to as a neighbor map segment of each of the other map segments in that group.

In an embodiment, each of the map segments may include a plurality of map slices. Each of the map slices may include mapping information between logical addresses and physical addresses, which correspond to a plurality of storage areas. Each of the storage areas may correspond to one page, one memory block, one plane or one die, but embodiments of the present disclosure are not limited thereto.

In an embodiment, the CPU 2130a may load or cache only one map segment per map segment group into the buffer memory 2150a. For example, when the address mapping table includes four map segment groups, the CPU 2130a may load one map segment per map segment group, i.e., a total of four map segments into the buffer memory 2150a.

Figure 8:
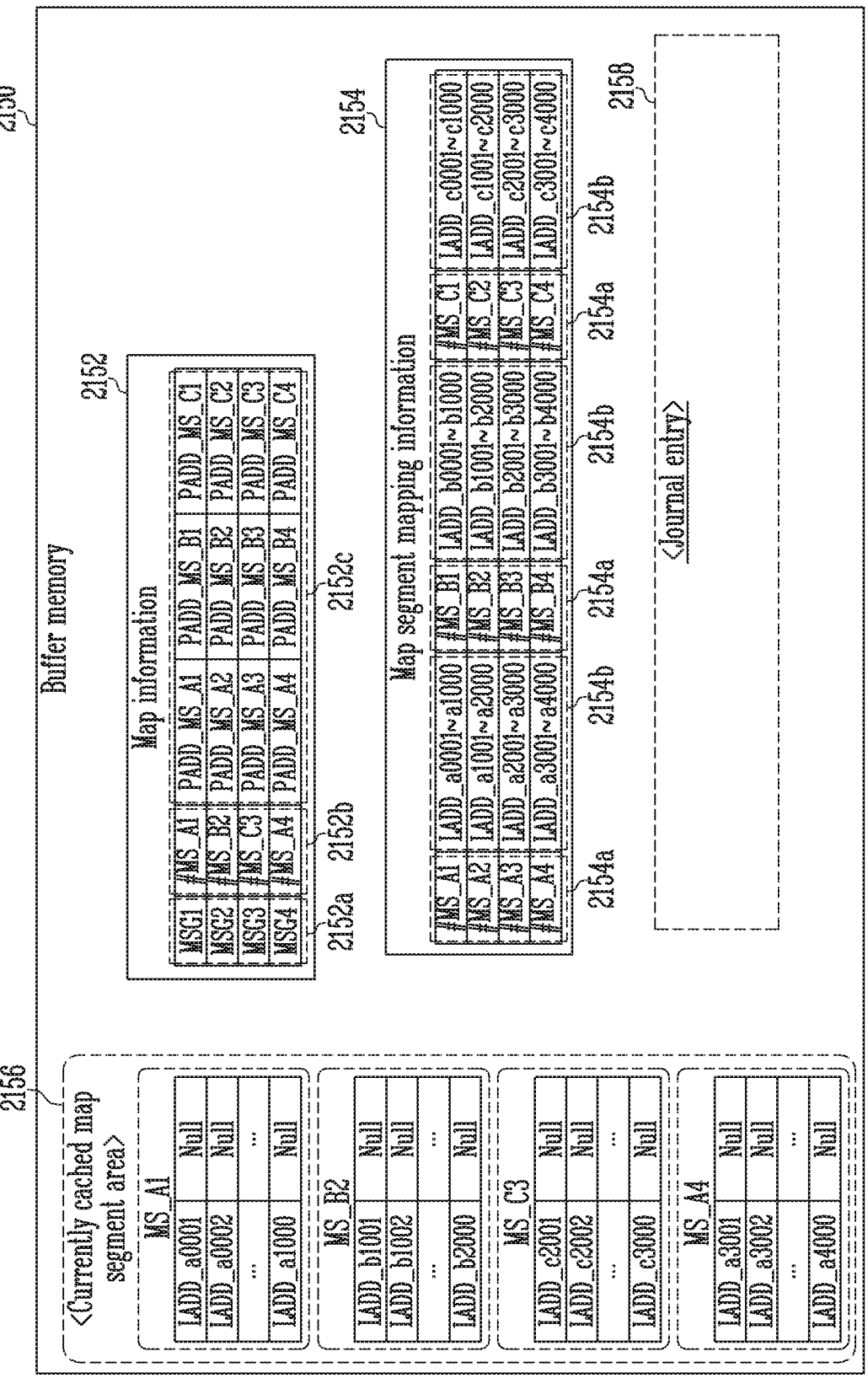
FIG. 8 is a diagram illustrating a buffer memory in accordance with an embodiment of the present disclosure.

In an embodiment, the CPU 2130a may load map segment mapping information stored in the non-volatile memory device 2200a into the buffer memory 2150a (see the map segment mapping information 2154 of FIG. 8). The map segment mapping information may include identification information 2154a of each of map segments and logical address information 2154b corresponding to each of the map segments. The CPU 2130a may identify a map segment (target map segment) corresponding to a logical address (target logical address) in a program request or read request.

In an embodiment, the CPU 2130a may manage map information in the buffer memory 2150a (see the map information 2152 of FIG. 8). The map information may include at least one of map segment group identification information 2152a, currently cached map segment identification information 2152b, or map segment position information 2152c. The map segment group identification information 2152a may be information used to identify a map segment group constituting the address mapping table. The currently cached map segment identification information 2152b may be information used to identify a map segment currently loaded into the buffer memory 2150a. The map segment position information 2152c may include a physical address corresponding to a storage area in which each of map segments is stored (or flushed) in the nonvolatile memory device 2200a.

In an embodiment, the CPU 2130a may check whether a target map segment is loaded into the buffer memory 2150a. For example, the CPU 2130a may check whether the target map segment is loaded into the buffer memory 2150a with reference to the currently cached map segment identification information in the map information.

In a program operation, when a target map segment is loaded into the buffer memory 2150a, the CPU 2130a may update the target map segment according to a physical address newly allocated corresponding to a target logical address, and perform the program operation on a storage area corresponding to the newly allocated physical address. The CPU 2130a may generate journal data including an updated item of the target map segment, and store the generated journal data in a journal entry in the buffer memory 2150a. The journal entry may mean a space allocated in the buffer memory 2150a so as to store journal data.

In the program operation, when the target map segment is not loaded into the buffer memory 2150a, the CPU 2130a may flush a neighbor map segment of the target map segment to the non-volatile memory device 2200a, and load the target map segment into the buffer memory 2150a. The neighbor map segment flushed to the non-volatile memory device 2200a may be referred to a victim map segment, and is in the same map segment group as the target map segment. The CPU 2130a may refer to the map segment position information 2152c included in the map information 2152 in order to load the target map segment into the buffer memory 2150a.

In a read operation, when a target map segment is loaded into the buffer memory 2150a, the CPU 2130a may identify a physical address corresponding to a target logical address with reference to the target map segment, and perform the read operation on a storage area corresponding to the identified physical address.

In the read operation, when the target map segment is not loaded into the buffer memory 2150a, the CPU 2130a may flush a neighbor map segment of the target map segment to the non-volatile memory device 2200a, and load the target map segment into the buffer memory 2150a. The neighbor map segment flushed to the non-volatile memory device 2200a may be referred to a victim map segment. The CPU 2130a may refer to the map segment position information included in the map information in order to load the target map segment into the buffer memory 2150a.

In another embodiment, in the read operation, when the target map segment is not loaded into the buffer memory 2150a, the CPU does not flush a neighbor map segment of the target map segment to the non-volatile memory device 2200a, and may load the target map segment into the buffer memory 2150a temporarily. The target map segment temporarily loaded into the buffer memory 2150a may be unloaded from the buffer memory 2150a, when a logical address included in a subsequent read request does not correspond to the temporarily loaded target map segment.

When a victim map segment among map segments loaded into the buffer memory 2150a is flushed to the non-volatile memory device 2200a, the CPU 2130a may update the map segment position information 2152c included in the map information 2152. That is, the CPU 2130a may reflect, to the map segment position information 2152c, a physical address corresponding to a storage area to which the victim map segment is flushed.

In an embodiment, the CPU 2130a may configure flush data whenever a set condition is satisfied, and flush the configured flush data to the non-volatile memory device 2200a. For example, the CPU 2130a may configure flush data when journal data of a set size is generated, a target map segment is not loaded into the buffer memory 2150a, and/or a flush operation is performed a set number of times. In each case, the flush data may be configured differently.

In an embodiment, when journal data of a set size is generated, the CPU 2130a may configure flush data including the generated journal data (i.e., journal entry of flush data in FIG. 9) and any one map slice in any one map segment among map segments loaded into the buffer memory 2150a.

Figure 10:
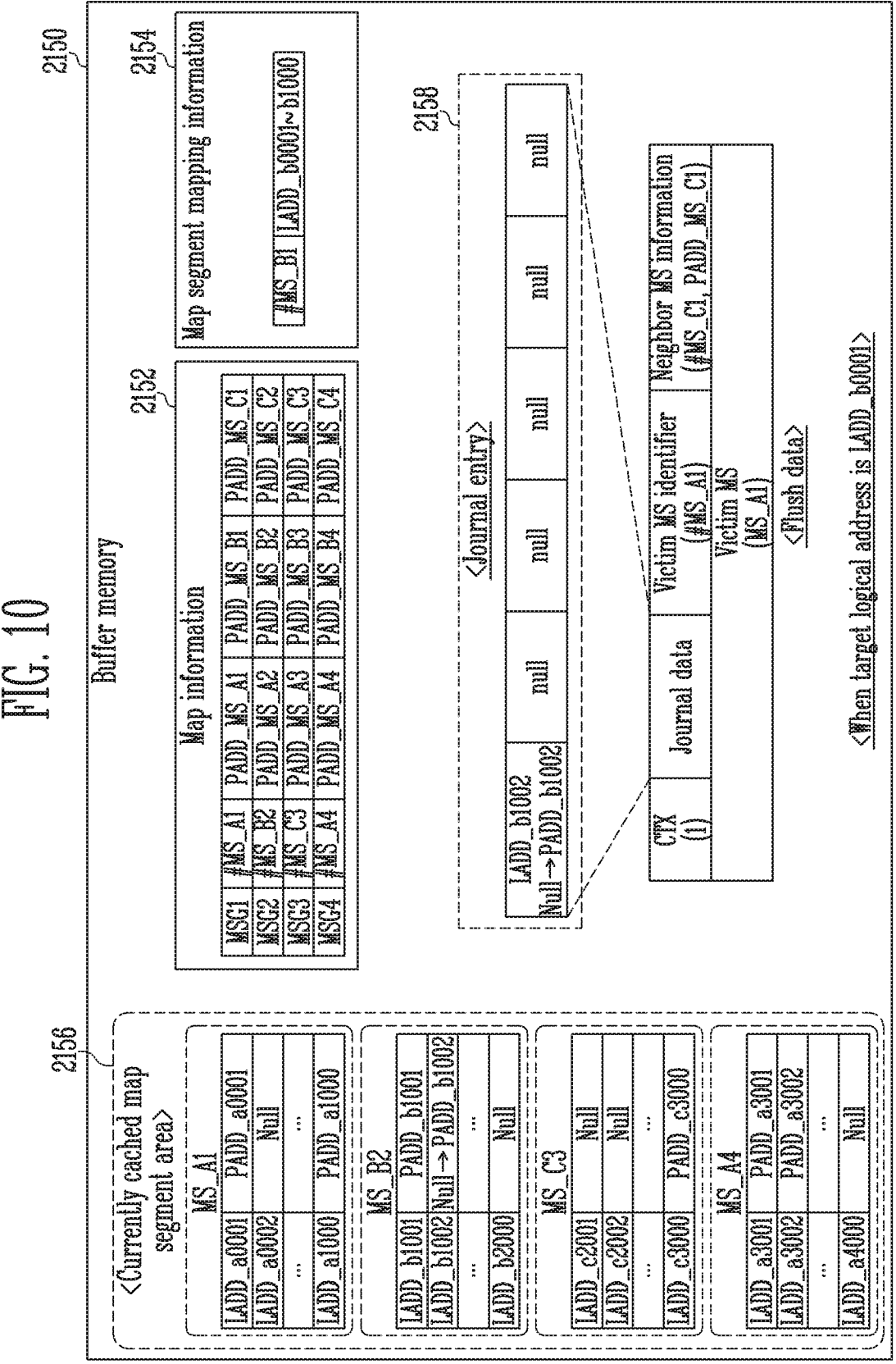
FIG. 10 is a diagram illustrating an example in which flush data is configured in accordance with an embodiment of the present disclosure.

In an embodiment, when the target map segment (e.g., the map segment MS_B1 in FIG. 10) is not loaded into the buffer memory 2150a, the CPU 2130a may configure flush data including at least one of identification information of a victim map segment (i.e., #MS_A1 of flush data in FIG. 10), position information of the other neighbor map segments except the victim map segment (i.e., #MS_C1, PADD_MS_C1 of flush data in FIG. 10) among neighbor map segments of the target map segment, or the victim map segment (i.e., MS_A1 of flush data in FIG. 10).

In an embodiment, when a flush operation is performed a set number of times, the CPU 2130a may configure flush data including the map information 2152 managed in the buffer memory 2150a. The set number of times may be arbitrarily or experimentally determined. For example, the set number of times may be determined to be greater than a number of map segments included in the address mapping table.

Figure 9:
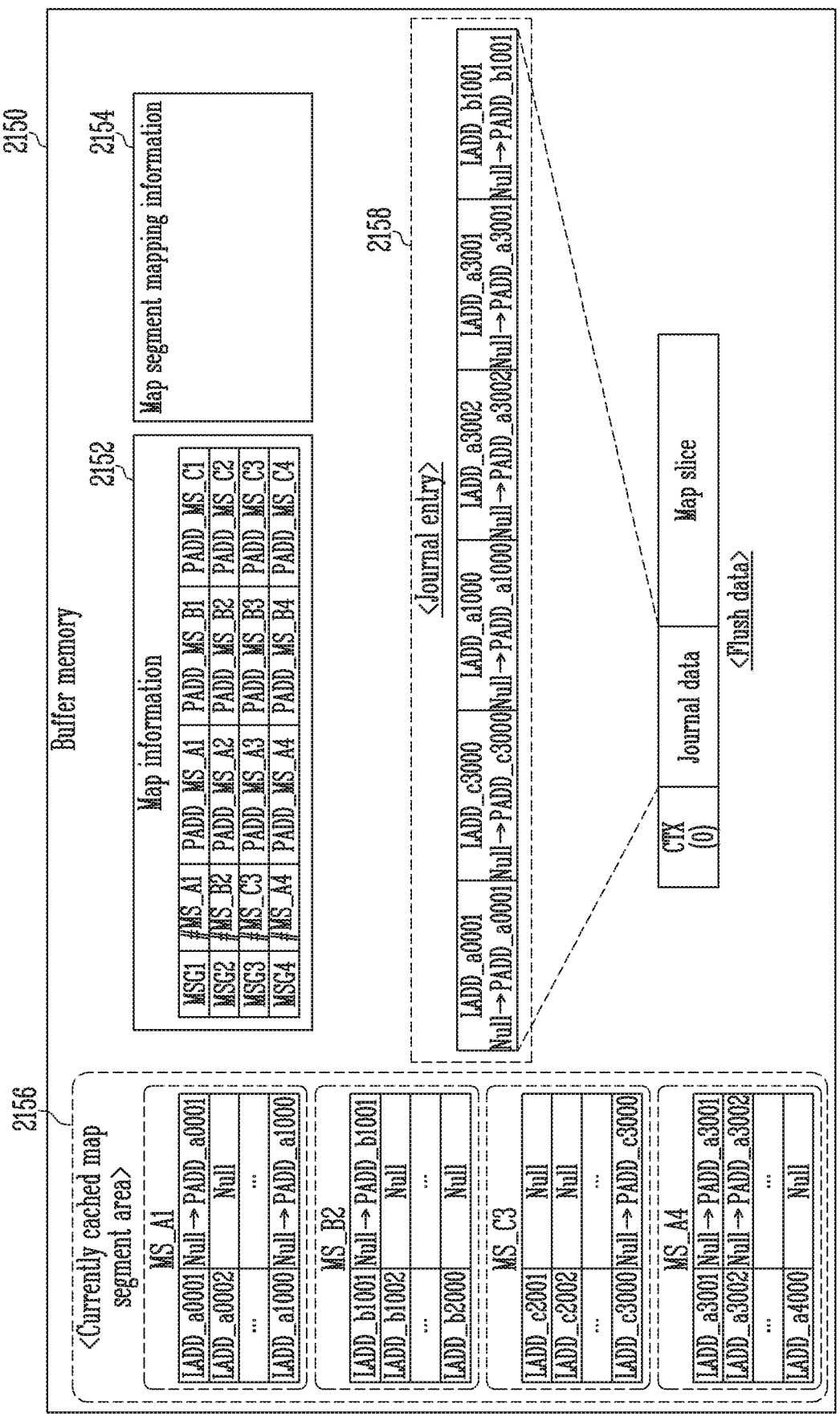
FIG. 9 is a diagram illustrating an example in which flush data is configured in accordance with an embodiment of the present disclosure.

In an embodiment, the flush data may further include context information (see CTX of flush data in FIGS. 9 and 10). The context information may include information representing a cause that the flush data is configured. For example, the context information may include information representing whether the flush data has been configured because the journal data of a set size is generated or because the target map segment is not loaded into the buffer memory 2150a.

When flush data is configured, the CPU 2130a may flush the configured flush data to the non-volatile memory device 2200a. When the flush data is configured because the target map segment is not loaded into the buffer memory 2150a, the CPU 2130a may update the map information 2152 according to a physical address corresponding to the storage area to which the victim map segment included in the flush data is flushed (see FIG. 11). Also, the CPU 2130a may load the target map segment into the buffer memory 2150a (see "MS_B1" of "currently cached map segment area" in FIG. 11).

The CPU 2130a may update the target map segment loaded into the buffer memory 2150a according to a physical address allocated corresponding to the target logical address, and generate journal data including an updated item of the target map segment (see journal data of flush data in FIG. 9).

In power-off, the CPU 2130a may configure flush data including journal data included in a journal entry, and flush the configured flush data to the non-volatile memory device 2200a. The flush data may include at least one of context information, journal data, or a map slice. The map slice included in the flush data may be a map slice included in any one map segment among map segments loaded into the buffer memory 2150a.

In power-on, the CPU 2130a may rebuild recent map information in the buffer memory 2150a. The recent map information may mean map information managed in the buffer memory 2150a at the time of the power-off.

The CPU 2130a may identify map information flushed lastly by performing a search on the non-volatile memory device 2200a, and load the identified map information into the buffer memory 2150a. A binary search technique may be used so as to check the lastly flushed map information, but embodiments of the present disclosure are not limited thereto.

The CPU 2130a may rebuild recent map information by reflecting flush data, which flushed after the lastly flushed map information is flushed, to the lastly flushed map information.

In an embodiment, the CPU 2130a may identify flush data having context information (see CTX of flush data in FIGS. 9 and 10) representing that the flush data has been configured since the target map segment is not loaded into the buffer memory 2150a, among the flush data flushed after the lastly flushed map information is flushed.

The CPU 2130a may rebuild recent map information by selecting flush data in a sequence in which the identified flush data are flushed and sequentially replaying identification information of a victim map segment (i.e., #MS_A1 of flush data in FIG. 10) and position information of neighbor map segments (i.e., #MS_C1, PADD_MS_C1 of flush data in FIG. 10) included in the selected flush data.

When the recent map information is rebuilt, the CPU 2130a may determine that map segments corresponding to currently cached map segment identification information 2152b included in the rebuilt map information 2152 is to be loaded into the buffer memory 2150a. The map segments corresponding to the currently cached map segment identification information 2152b included in the rebuilt map information 2152 may be map segments that existed in the buffer memory 2150a at the time of the power-off.

The CPU 2130a may identify a physical address of a storage area in which the map segments corresponding to the currently cached map segment identification information 2152b included in the rebuilt map information 2152 are stored, with reference to the map segment position information 2152c included in the rebuilt map information 2152.

The CPU 2130a may load currently cached map segments into the buffer memory 2150a, by accessing the storage area corresponding to the identified physical address. The currently cached map segments may be map segments that were cached in the buffer memory 2150a at the time of the power-off.

The CPU 2130a may perform a journal replay operation so as to update the currently cached map segments loaded into the buffer memory 2150a to a recent state.

The CPU 2130a may update each of the currently cached map segments by sequentially replaying journal data flushed after the corresponding map segment is flushed in the order in which the journal data is flushed.

When the journal replay operation on each of the currently cached map segments is completed, the currently cached map segments may be rebuilt to reflect the status at the time of the power-off.

The buffer memory 2150a may be a temporary memory device for temporarily storing data while the memory controller 2100a is controlling the non-volatile memory device 2200a.

In a program operation, the buffer memory 2150a may store data received from the host interface 2110a, and transmit the stored data to the memory interface 2120a.

In a read operation, the buffer memory 2150a may store read data received from the non-volatile memory device 2200a, and transmit the stored read data to the host interface 2110a.

The buffer memory 2150a may be used as a storage for storing various information necessary for an operation of the memory controller 2100a. The buffer memory 2150a may store a plurality of tables. In an embodiment, an address mapping table in which logical and physical addresses are mapped to each other may be loaded into the buffer memory 2150a. In an embodiment, only a portion of the address mapping table may be loaded into the buffer memory 2150a. In an embodiment, map information 2152 may be loaded into the buffer memory 2150a. In an embodiment, the buffer memory 2150a may include a journal entry 2158, and journal data may be stored in the journal entry 2158 (see FIG. 9). In an embodiment, map segment mapping information 2154 may be loaded into the buffer memory 2150a (see FIG. 8).

Figure 2:
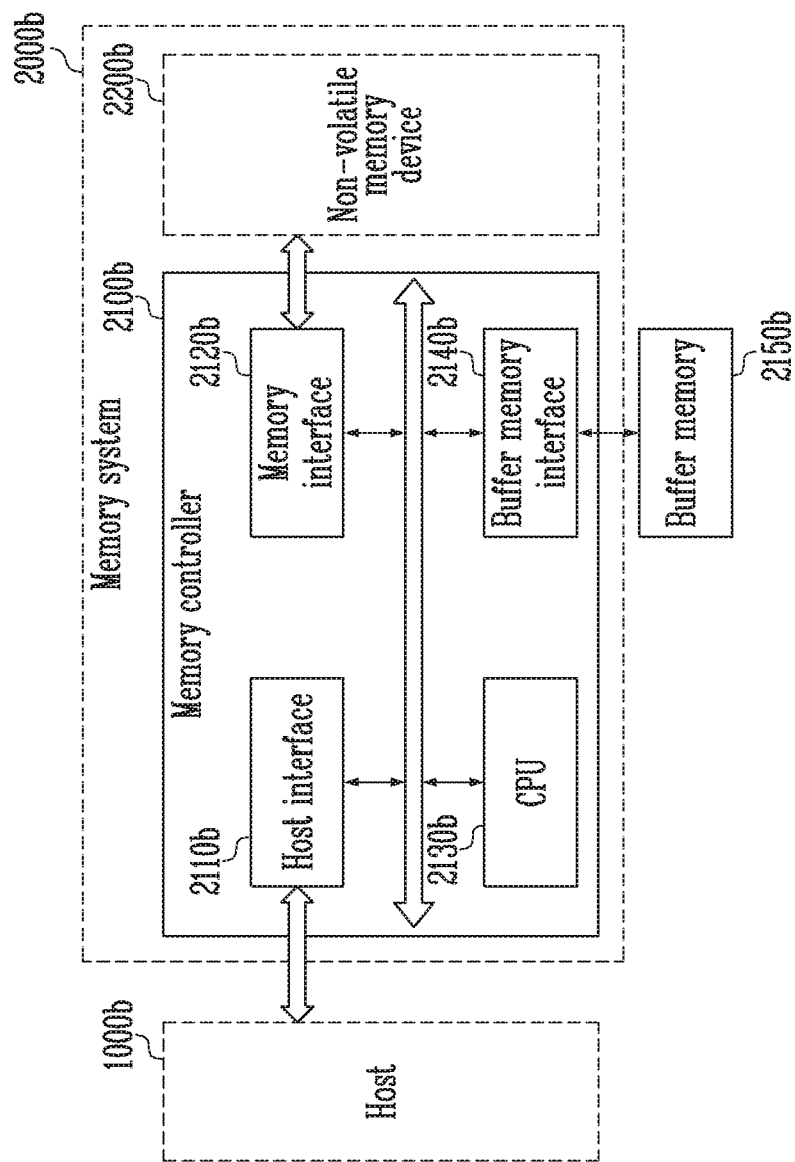
FIG. 2 is a diagram illustrating a memory system in accordance with an embodiment of the present disclosure.

FIG. 2 is a diagram illustrating a memory system in accordance with an embodiment of the present disclosure.

The memory system 2000b may include a non-volatile memory device 2200b configured to store data, a memory controller 2100b configured to control the non-volatile memory device 2200b in response to a request from a host 1000b, and a buffer memory 2150b configured to temporarily store data while the memory controller 2100b is controlling the non-volatile memory device 2200b.

The host 1000b, the non-volatile memory device 2200b, and the buffer memory 2150b, which are shown in FIG. 2, may perform the same operations as the host 1000a, the non-volatile memory device 2200a, and the buffer memory 2150a, which are shown in FIG. 1.

The memory controller 2100b may include a host interface 2110b, a memory interface 2120b, a central processing unit (CPU) 2130b, and a buffer memory interface 2140b.

The host interface 2110b, the memory interface 2120b, and the CPU 2130b, which are shown in FIG. 2, may perform the same operations as the host interface 2110a, the memory interface 2120a, and the CPU 2130a, which are shown in FIG. 1.

The buffer memory interface 2140b may perform communication with the buffer memory 2150b by using any of various interface protocols.

Figure 3:
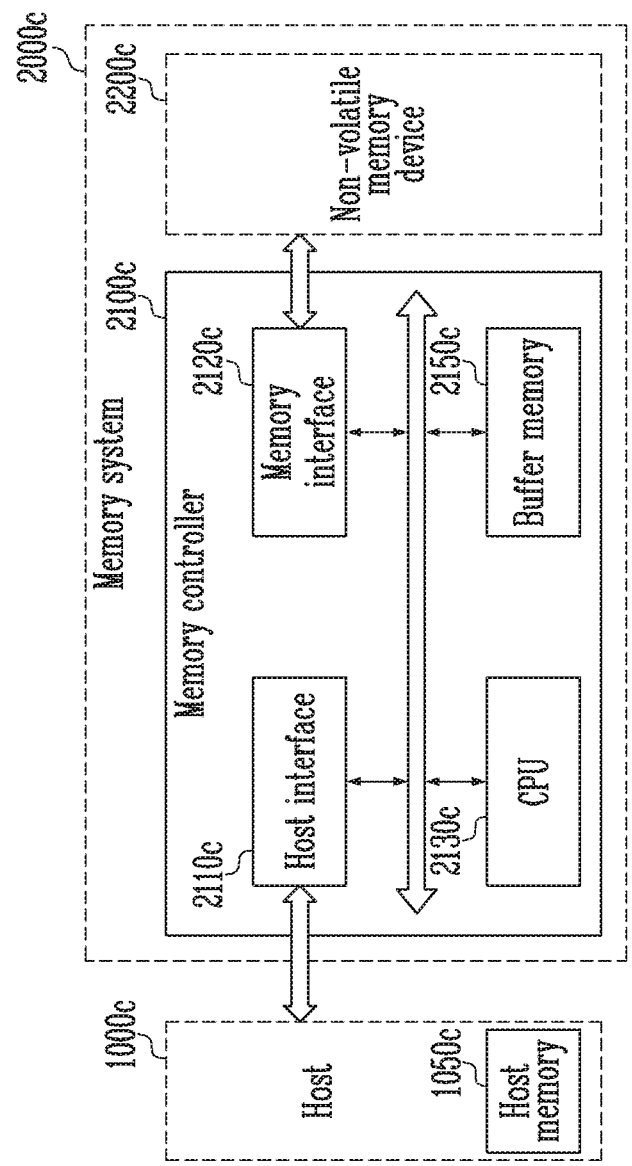
FIG. 3 is a diagram illustrating a memory system in accordance with an embodiment of the present disclosure.

FIG. 3 is a diagram illustrating a memory system in accordance with an embodiment of the present disclosure.

The memory system 2000c may include a non-volatile memory device 2200c configured to store data and a memory controller 2100c configured to control the non-volatile memory device 2200c in response to a request from a host 1000c.

The memory controller 2100c may include a host interface 2110c, a memory interface 2120c, a central processing unit (CPU) 2130c, and a buffer memory 2150c.

The host interface 2110c, the memory interface 2120c, the CPU 2130c, the buffer memory 2150c, and the non-volatile memory device 2200c, which are shown in FIG. 3, may perform the same operations as the host interface 2110a, the memory interface 2120a, the CPU 2130a, the buffer memory 2150a, and the non-volatile memory device 2200a, which are shown in FIG. 1.

The host 1000c may include a host memory 1050c. The host memory 1050c may be a temporary memory area for temporarily storing data while the memory controller 2100c is controlling the non-volatile memory device 2200c.

In an embodiment, the CPU 2130c may further load some of meta data loaded into the buffer memory 2150c into the host memory 1050c. For example, the CPU 2130c may further load a map segment loaded into the buffer memory 2150c into the host memory 1050c. The map segment further loaded into the host memory 1050c may be a rebuilt map segment.

In an embodiment, when the map segment loaded into the buffer memory 2150c is updated, the CPU 2130c may reflect a corresponding update content to the map segment loaded into the host memory 1050c. For example, when a target map segment among map segments loaded into the buffer memory 2150c is updated, the CPU 2130c may update the same map segment as the target map segment among the map segments loaded into the host memory 1050c.

In an embodiment, when a neighbor map segment of the target map segment among the map segments loaded into the buffer memory 2150c is flushed to the non-volatile memory device 2200c, the CPU 2130c may unload, from the host memory 1050c, the same map segment as the neighbor map segment among the map segments loaded into the host memory 1050c.

Figure 4:
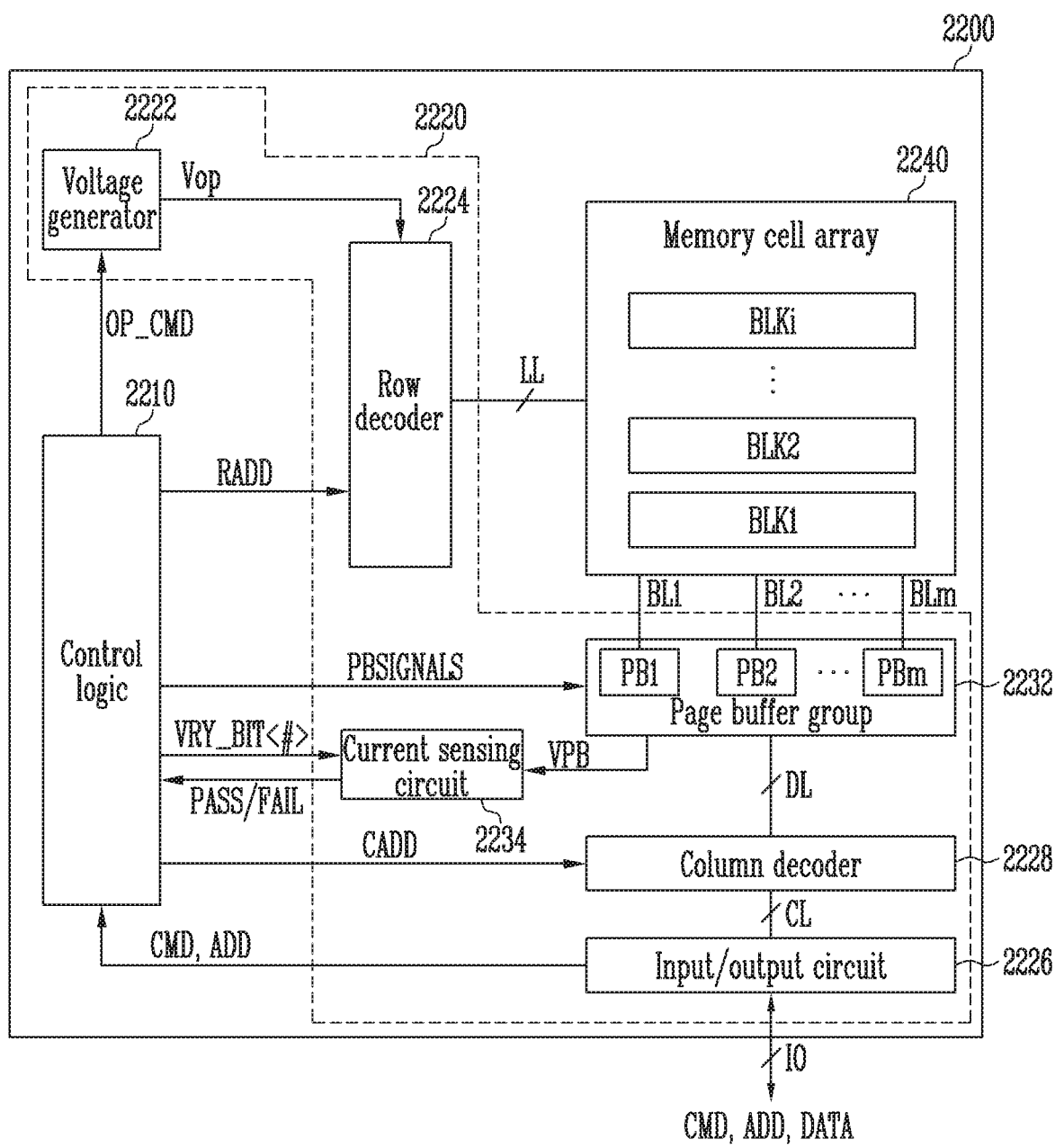
FIG. 4 is a diagram illustrating a non-volatile memory device, such as that shown in FIGS. 1 to 3.

FIG. 4 is a diagram illustrating a non-volatile memory device shown in FIGS. 1 to 3.

A non-volatile memory device 2200 shown in FIG. 4 may be the non-volatile memory device 2200a, the non-volatile memory device 2200b, or the non-volatile memory device 2200c, which are respectively shown in FIGS. 1 and 3.

The non-volatile memory device 2200 may include control logic 2210, peripheral circuit 2200, and a memory cell array 2240.

The control logic 2210 may control the peripheral circuit 2220 under the control of the memory controller (e.g., 2100a shown in FIG. 1, 2100b shown in FIG. 2, or 2100c shown in FIG. 3).

The control logic 2210 may control the peripheral circuit 2200 in response to a command CMD and an address ADD, which are received from the memory controller, through an input/output circuit 2226. For example, the control logic 2210 may output an operation signal OP_CMD, a row address RADD, a column address CADD, page buffer control signals PBSIGNALS, and an allow bit VRY_BIT<#> in response to the command CMD and the address ADD. The control logic 2210 may determine whether a verify operation has passed or failed in response to a pass signal PASS or a fail signal FAIL, which is received from a current sensing circuit 2234.

The peripheral circuit 2200 may perform a program operation for storing data in the memory cell array 2240, a read operation for outputting data stored in the memory cell array 2240, and an erase operation for erasing data stored in the memory cell array 2240.

The peripheral circuit 2220 may include a voltage generator 2222, a row decoder 2224, the Input/output circuit 2226, a column decoder 2228, a page buffer group 2232, and the current sensing circuit 2234.

The voltage generator 2222 may generate various operating voltages Vop used in program, read, and erase operations in response to an operation signal OP_CMD received from the control logic 2210. For example, the voltage generator 2222 may transfer, to the row decoder 2224, a program voltage, a verify voltage, a pass voltage, a read voltage, an erase voltage, a turn-on voltage, and the like.

The row decoder 2224 may transfer operating voltages Vop to local lines LL coupled to a selected memory block among memory blocks included in the memory cell array 2240, in response to a row address RADD received from the control logic 2210. The local lines LL may include local word lines, local drain lines, and local source lines. Besides, the local lines LL may include various lines coupled to the memory block, such as a source line.

The input/output circuit 2226 may transfer a command CMD and an address ADD, which are received from the memory controller through input/output lines IO, to the control logic 2210, or exchange data DATA with the column decoder 2228.

The column decoder 2228 may transfer data between the input/output circuit 2226 and the page buffer group 2232 in response to a column address CADD received from the control logic 2210. For example, the column decoder 2228 may exchange data with page buffers PB1 to PBm through data lines DL, or exchange data with the input/output circuit 2226 through column lines CL.

The page buffer group 2232 may be coupled to bit lines BL1 to BLm commonly coupled to memory blocks BLK1 to BLKi. The page buffer group 2232 may include a plurality of page buffers PB1 to PBm coupled to the bit lines BL1 to BLm. For example, one page buffer may be coupled for each bit line. The page buffers PB1 to PBm may operate in response to page buffer control signals PBSIGNALS received from the control logic 2210. For example, the page buffers PB1 to PBm may temporarily store program data received from the memory controller in a program operation, and adjust a voltage applied to the bit lines BL1 to BLm according to the program data. Also, the page buffers PB1 to PBm may temporarily store data received through the bit lines BL1 to BLm in a read operation, or sense voltages or currents of the bit lines BL1 to BLm.

The current sensing circuit 2234 may generate a reference current in response to an allow bit VRY_BIT<#>, and output a pass signal PASS or a fail signal FAIL by comparing a reference voltage generated by the reference current with a sensing voltage VPB received from the page buffer group 2232.

The memory cell array 2240 may include a plurality of memory blocks BLK1 to BLKi in which data is stored. User data and various information necessary for an operation of the non-volatile memory device 2200 may be stored in the memory blocks BLK1 to BLKi. The memory blocks BLK1 to BLKi may be implemented in a two-dimensional structure or three-dimensional structure, and be configured identically to one another.

Figure 5:
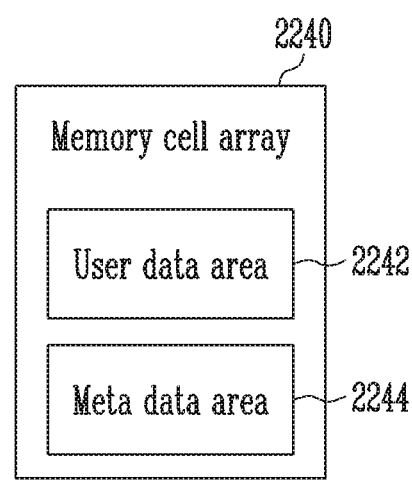
FIG. 5 is a diagram illustrating a memory cell array, such as that shown in FIG. 4.

FIG. 5 is a diagram illustrating the memory cell array shown in FIG. 4.

The memory cell array 2240 may include a user data area 2242 and a meta data area 2244. Each of the user data area 2242 and the meta data area 2244 may include a plurality of storage areas. Each of the storage areas may correspond to one memory cell, a plurality of memory cells, one page, a plurality of pages, one memory block, or a plurality of memory blocks.

Data program-requested from the host (e.g., 1000a shown in FIG. 1, 1000b shown in FIG. 2, or 1000c shown in FIG. 3) may be stored in the user data area 2242.

Various meta data necessary for management of the memory system (e.g., 2000a shown in FIG. 1, 2000b shown in FIG. 2, or 2000c shown in FIG. 3) may be stored (or flushed) in the meta data area 2244. For example, meta data corresponding to at least one of an address mapping table, map information, valid page information or a program/erase count may be stored (or flushed) in the meta data area 2244.

Figure 6:
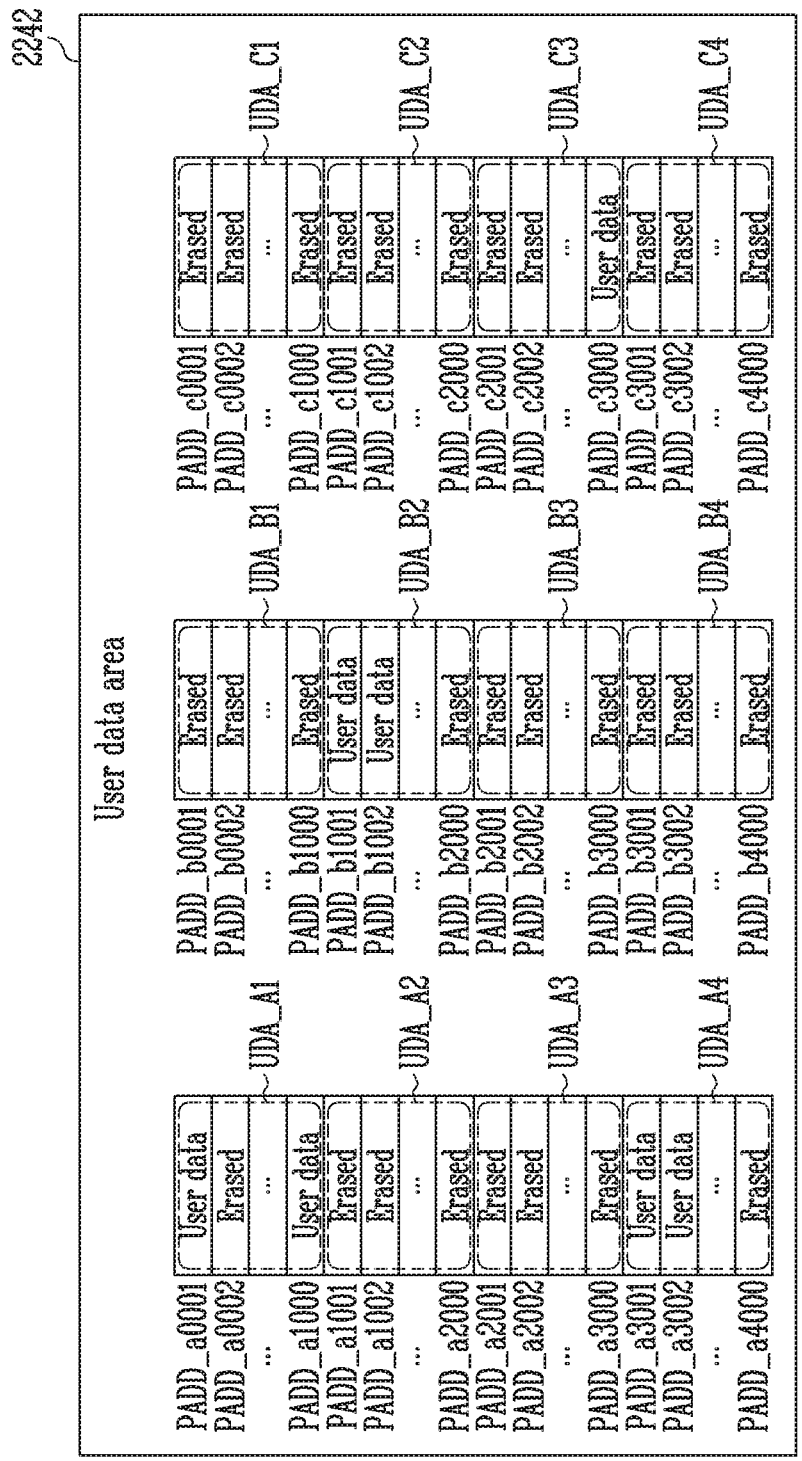
FIG. 6 is a diagram illustrating a user data area, such as that shown in FIG. 5.

FIG. 6 is a diagram illustrating the user data area shown in FIG. 5.

By way of example, a configuration in which 12000 storage areas are included in the user data area 2242 is illustrated in FIG. 6, although embodiments of the present disclosure are not limited thereto.

In the example shown in FIG. 6, PADD_xxxxx represents a physical address corresponding to a storage area.

The storage areas included in the user data area 2242 may be grouped into a plurality of storage area groups UDA_A1 to UDA_A4, UDA_B1 to UDA_B4, and UDA_C1 to UDA_C4. In an embodiment, each of the storage area groups UDA_A1 to UDA_A4, UDA_B1 to UDA_B4, and UDA_C1 to UDA_C4 may include the same number of storage areas. In FIG. 6, an example in which each storage area group includes 1000 storage areas is illustrated. For example, storage area group UDA_A1 may include storage areas corresponding to physical addresses PADD_a0001 to PADD_a1000.

Data program-requested from the host (e.g., 1000a shown in FIG. 1, 1000b shown in FIG. 2, or 1000c shown in FIG. 3) may be stored in the user data area 2242. In FIG. 6, "user data" represents that data program-requested from the host is stored in a storage area, and "erased" represents that no data is stored in a storage area.

Figure 7:
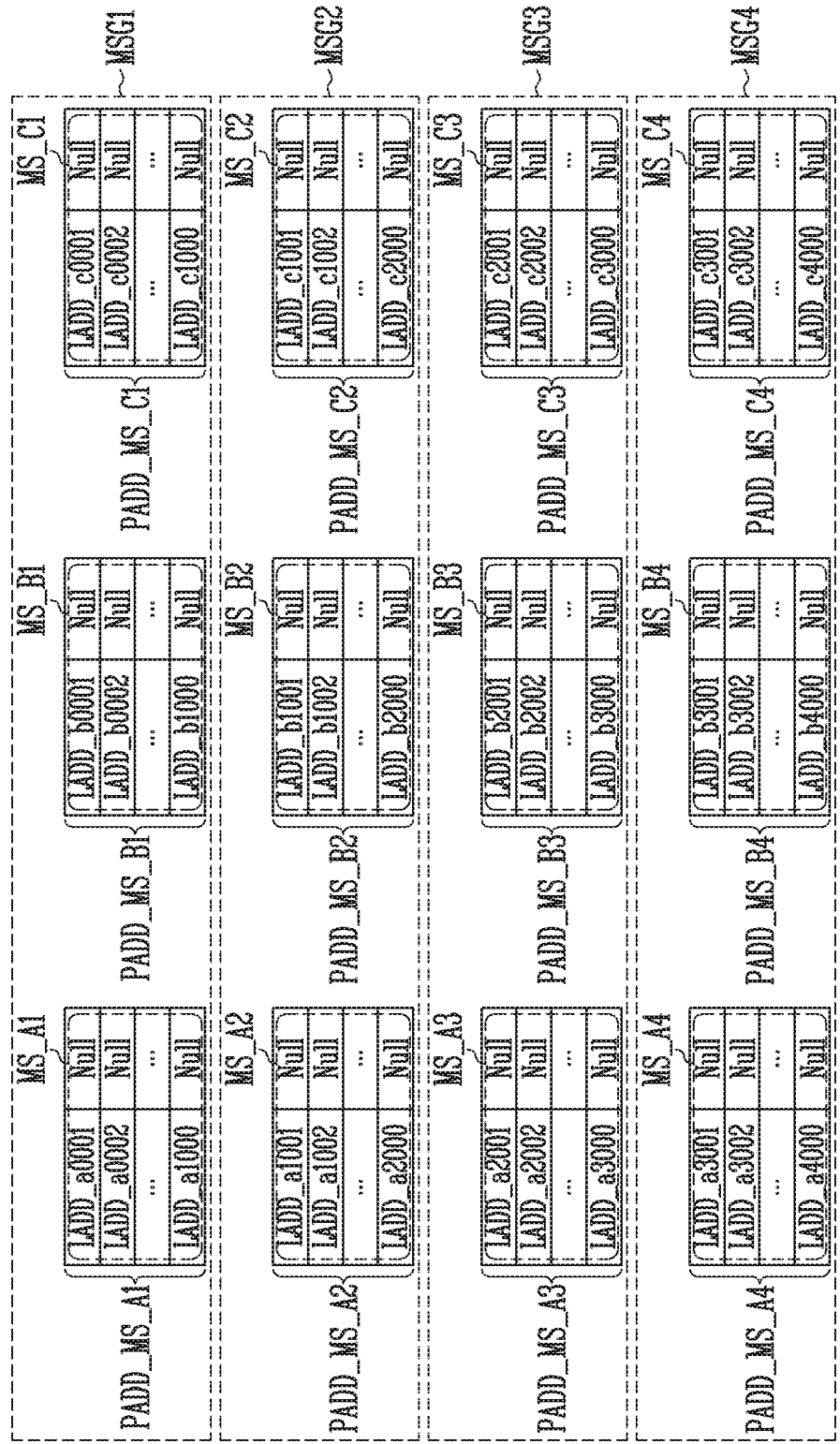
FIG. 7 is a diagram illustrating an address mapping table.

FIG. 7 is a diagram illustrating an address mapping table.

The address mapping table shown in FIG. 7 may be stored in the meta data area 2244 shown in FIG. 5.

The address mapping table may include mapping information between physical addresses corresponding to the respective storage areas included in the user data area 2242 shown in FIG. 5 and logical addresses corresponding to the respective physical addresses.

The address mapping table may include entries of which number corresponding to that of the storage areas included in the user data area 2242. Mapping information between one logical address and one physical address corresponding to the one logical address may be included in each of the entries included in the address mapping table.

The entries included in the address mapping table may be grouped into a plurality of map segments. That is, the address mapping table may include a plurality of map segments MS_A1 to MS_A4, MS_B1 to MS_B4, and MS_C1 to MS_C4.

In an embodiment, each of the map segments may correspond to the respective storage area groups in the user data area 2242. For example, map segment MS_A1 shown in FIG. 7 may correspond to the storage area group UDA_A1 shown in FIG. 6. Similarly, the map segments MS_A2 to MS_A4, MS_B1 to MS_B4, and MS_C1 to MS_C4 shown in FIG. 7 may respectively correspond to the storage area groups UDA_A2 to UDA_A4, UDA_B1 to UDA_B4, and UDA_C1 to UDA_C4.

Each of the map segments MS_A1 to MS_A4, MS_B1 to MS_B4, and MS_C1 to MS_C4 may include address mapping information corresponding to a storage area group corresponding thereto. For example, the map segment MS_A1 may include address mapping information corresponding to the storage area group UDA_A1.

In FIG. 7, PADD_MS_xx represents a physical address of a storage area in which a map segment xx is stored.

In an embodiment, the map segments included in the address mapping table may be grouped into a plurality of map segment groups MSG. For example, map segments MS_A1, MS_B1, and MS_C1 may be grouped into map segment group MSG1, map segments MS_A2, MS_B2, and MS_C2 may be grouped into map segment group MSG2, map segments MS_A3, MS_B3, and MS_C3 may be grouped into map segment group MSG3, and map segments MS_A4, MS_B4, and MS_C4 may be grouped into map segment group MSG4.

As described above, each of the map segments of the same map segment group as a target map segment may be referred to as a neighbor map segment of the target map segment. For example, when the target map segment is the map segment MS_A1, each of the map segments MS_B1 and MS_C1 may referred to as a neighbor map segment of the target map segment MS_A1.

FIG. 8 is a diagram illustrating a buffer memory in accordance with an embodiment of the present disclosure.

The buffer memory 2150 shown in FIG. 8 may be the buffer memory 2150a shown in FIG. 1, the buffer memory 2150b shown in FIG. 2, or the buffer memory 2150c shown in FIG. 3.

At least one of map information 2152 or map segment mapping information 2154 may be loaded into the buffer memory 2150.

The map information 2152 may be loaded from the non-volatile memory device (e.g., 2200a shown in FIG. 1, 2200b shown in FIG. 2, or 2200c shown in FIG. 3), in power-on of the memory system (e.g., 2000a shown in FIG. 1, 2000b shown in FIG. 2, or 2000c shown in FIG. 3). In an embodiment, the map information 2152 loaded from the non-volatile memory device may be rebuilt in the buffer memory 2150 according to data received from the non-volatile memory device.

The map information 2152 may include at least one of map segment group identification information 2152a, currently cached map segment identification information 2152b, or map segment position information 2152c. The map segment group identification information 2152a may be information used to identify a map segment group constituting an address mapping table. The currently cached map segment identification information 2152b may be identification information used to identify map segments currently loaded into a currently cached map segment area 2156. The map segment position information 2152c may represent a physical address corresponding to a storage area of the non-volatile memory device, in which map segments are stored.

The map segment mapping information 2154 may be loaded from the non-volatile memory device in the power-on of the memory system. The map segment mapping information 2154 may include identification information 2154a of each of map segments and logical address information 2154b corresponding to the respective map segments.

The buffer memory 2150 may include at least one of the currently cached map segment area 2156 or a journal entry 2158.

Target map segments corresponding to a target logical address may be loaded into the currently cached map segment area 2156. For example, in a program operation, a target map segment corresponding to a target logical address included in a program request may be loaded into the buffer memory 2150 from the non-volatile memory device. For example, a map segment corresponding to the target logical address may be identified with reference to the map segment mapping information 2154, and the identified map segment may be loaded from a storage area of the non-volatile memory device, in which the identified map segment is stored, with reference to the map segment position information 2152c.

In an embodiment, one map segment per map segment group may be loaded into the currently cached map segment area 2156. For example, when the address mapping table includes four map segment groups, one map segment per map segment group, i.e., a total of four map segments may be loaded into the buffer memory 2150. In FIG. 8, an example in which map segments MS_A1, MS_B2, MS_C3, and MS_A4 belonging to different map segment groups are loaded into the currently cached map segment area 2156 is illustrated.

When a target map segment corresponding to the target logical address is not loaded into the currently cached map segment area 2156, a neighbor map segment of the target map segment may be flushed to the non-volatile memory device, and the target map segment may be loaded into the currently cached map segment area 2156, as is described below.

Journal data may be stored in the journal entry 2158. The journal data may include information on an updated item, when address mapping information of map segments loaded in the currently cached map segment area 2156 is updated. For example, when a new physical address is allocated corresponding to a target logical address, mapping information between the target logical address and a physical address newly allocated corresponding the target logical address may be included in the journal data.

In an embodiment, the map segments loaded into the currently cached map segment area 2156 may be further loaded into the host memory 1050c shown in FIG. 3. In an embodiment, the same map segment as a map segment flushed to the non-volatile memory device among the map segments loaded into the currently cached map segment area 2156 may be unloaded from the host memory 1050c. In an embodiment, when any one map segment among the map segments loaded into the currently cached map segment area 2156 is updated, the same map segment as the updated map segment among the map segments loaded into the host memory 1050c may be updated.

FIG. 9 is a diagram illustrating an example in which flush data is configured in accordance with an embodiment of the present disclosure.

In the embodiment described with reference to FIG. 9, a case where map segments MS_A1, MS_B2, MS_C3, and MS_A4 are loaded into the currently cached map segment area 2156 is assumed.

When program requests a received from the host (e.g., 1000a shown in FIG. 1, 1000b shown in FIG. 2, or 1000c shown in FIG. 3), physical addresses corresponding to target logical addresses included in the program requests may be allocated.

In the embodiment described with reference to FIG. 9, a case where all the target logical addresses included in the program requests belong to the map segments MS_A1, MS_B2, MS_C3, and MS_A4 loaded into the currently cached map segment area 2156 is assumed.

The map segments MS_A1, MS_B2, MS_C3, and MS_A4 may be updated according to newly allocated physical addresses. In FIG. 9, an example in which new physical addresses PADD_a0001, PADD_a1000, PADD_b1001, PADD_c3000, PADD_a3001, and PADD_a3002 are allocated corresponding to target logical addresses LADD_a0001, LADD_a1000, LADD_b1001, LADD_c3000, LADD_a3001, and LADD_a3002, and the map segments MS_A1, MS_B2, MS_C3, and MS_A4 are updated according to the allocated physical addresses PADD_a0001, PADD_a1000, PADD_b1001, PADD_c3000, PADD_a3001, and PADD_a3002 is illustrated.

Whenever a new physical address corresponding to a target logical address is allocated, i.e., whenever a map segment is updated, journal data including an updated item may be generated to be stored in the journal entry 2158.

In an embodiment, when enough journal data are gathered to fully fill the journal entry 2158, i.e., when the number of journal data generated is equal to a set number, flush data to be flushed to the non-volatile memory device may be configured.

As described above, when flush data is configured as journal data, the number of which are generated corresponds to a set number, the flush data may include at least one of context information CTX, journal data, or a map slice.

As described above, the context information CTX may represent a cause that the flush data is configured. For example, when flush data is configured as journal data, the number of which generated equals a set number, the context information CTX may be set to '0.'

The map slice may be a portion of any one map segment among the map segments loaded into the currently cached map segment area 2156.

The configured flush data may be flushed to the meta data area 2244 of the non-volatile memory device.

FIG. 10 is a diagram illustrating an example in which flush data is configured in accordance with an embodiment of the present disclosure.

In the embodiment described with reference to FIG. 10, it is assumed that, after the flush data described with reference to FIG. 9 is flushed, journal data corresponding to a logical address LADD_b1002 is generated to be stored in the journal entry 2158, and a program request including a target logical address LADD_b0001 is received.

A map segment to which the target logical address LADD_b0001 belongs may be identified with reference to the map segment mapping information 2154. When the target logical address LADD_b0001 is included in map segment MS_B1, the map segment MS_B1 may be referred to as a target map segment.

In order to update the address mapping information, the target map segment MS_B1 is to be loaded into the currently cached map segment area 2156. And, before the target map segment MS_B1 is loaded into the currently cached map segment area 2156, a neighbor map segment MS_A1 of the target map segment MS_B1 among the map segments loaded into the currently cached map segment area 2156 is to be selected as a victim map segment to be flushed to the non-volatile memory device. To this end, flush data may be configured.

As described above, when flush data is configured since the target map segment is not loaded into the currently cached map segment area 2156, the flush data may include at least one of context information CTX, journal data, victim map segment (MS) identifier, neighbor map segment (MS) information, or a victim map segment.

As described above, the context information CTX may represent a cause that the flush data is configured. For example, when flush data is configured as the target map segment is not loaded into the currently cached map segment area 2156, the context information CTX may be set to '1.'

The neighbor map segment information may include at least one of identification information of the other neighbor map segments except the victim map segment among neighbor map segments of the target map segment, or a physical address corresponding to a storage area in which each of the other neighbor map segments is stored. In the example shown in FIG. 10, since neighbor map segments of the target map segment MS_B1 are the map segments MS_A1 and MS_C1 and the victim map segment is the map segment MS_A1, at least one of identification information #MS_C1 of a neighbor map segment MS_C1 or a physical address PADD_MS_C1 of the storage area in which the neighbor map segment MS_C1 is stored may be included in the neighbor map segment information.

The configured flush data may be flushed to the meta data area 2244 of the non-volatile memory device.

Figure 11:
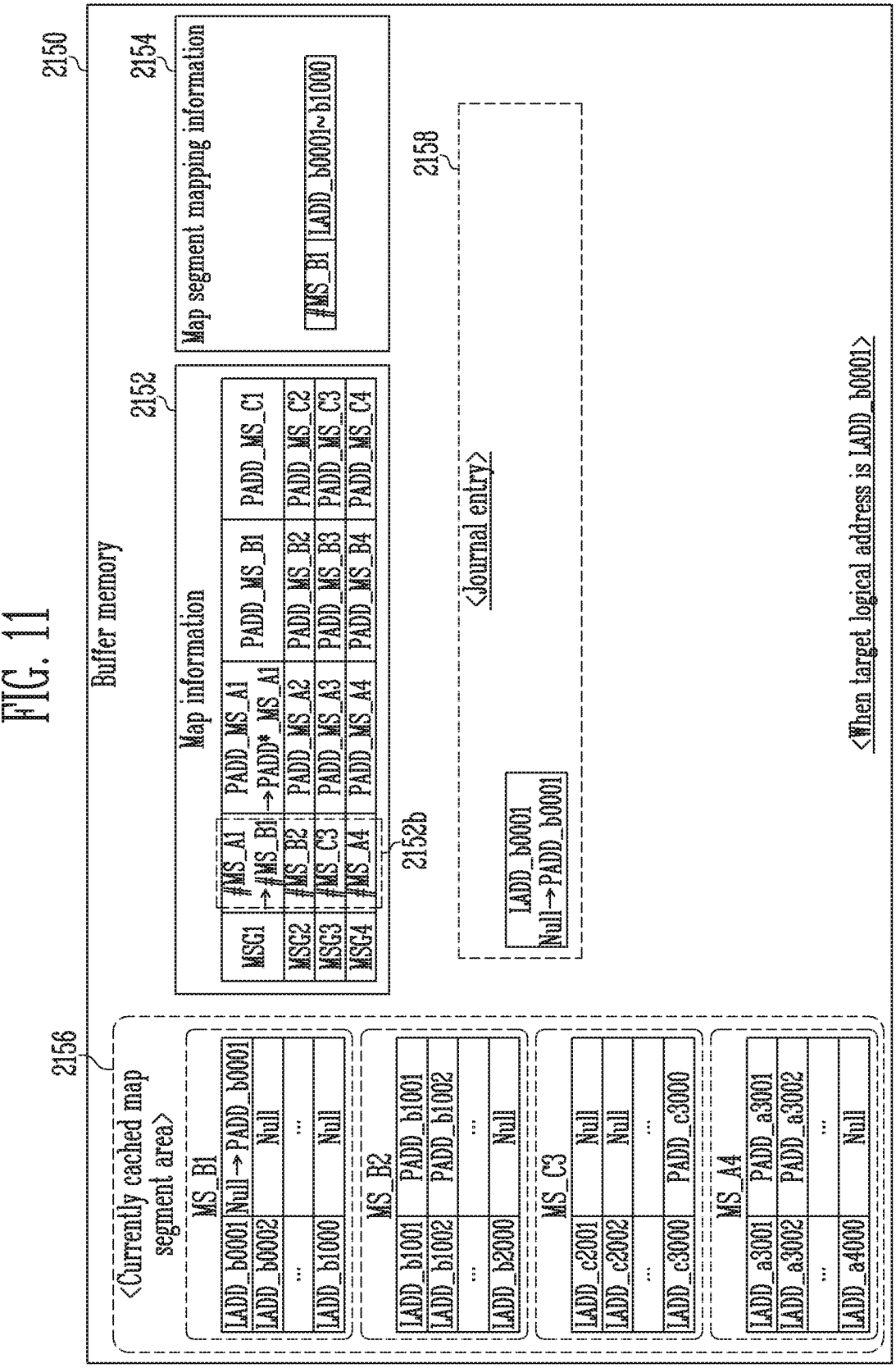
FIG. 11 is a diagram illustrating information updated in a buffer memory in accordance with an embodiment of the present disclosure.

FIG. 11 is a diagram illustrating information updated in the buffer memory in accordance with an embodiment of the present disclosure.

In the embodiment described with reference to FIG. 11, a case where the flush data described with reference to FIG. 10 is flushed is assumed.

When a victim map segment MS_A1 within the currently cached map segment area 2156 is flushed, a target map segment MS_B1 may be loaded into the area for the flushed victim map segment within the currently cached map segment area 2156. In addition, a physical address PADD_b0001 corresponding to the target logical address LADD_b0001 is allocated, and the target map segment MS_B1 may be updated. In addition, journal data including an updated item of the target map segment MS_B1 may be stored in the journal entry 2158.

Also, when a victim map segment MS_A1 is flushed, the map information 2152 may be updated according to a physical address corresponding to the storage area of the non-volatile memory device, to which the victim map segment MS_A1 is flushed. For example, when the victim map segment MS_A1 is flushed to a storage area corresponding to a physical address PADD*_MS_A1, the physical address corresponding to the victim map segment MS_A1 may be updated from a physical address PADD_MS_A1 to the physical address PADD*_MS_A1.

Meanwhile, when target map segment MS_B1 is loaded into the currently cached map segment area 2156, the currently cached map segment identification information 2152b of the map information 2152 may be updated. Since the victim map segment MS_A1 is flushed and the target map segment MS_B1 is loaded into the currently cached map segment area 2156, the currently cached map segment identification information 2152b corresponding to the map segment group MSG1 may be updated from #MS_A1 to #MS_B1.

Figure 12:
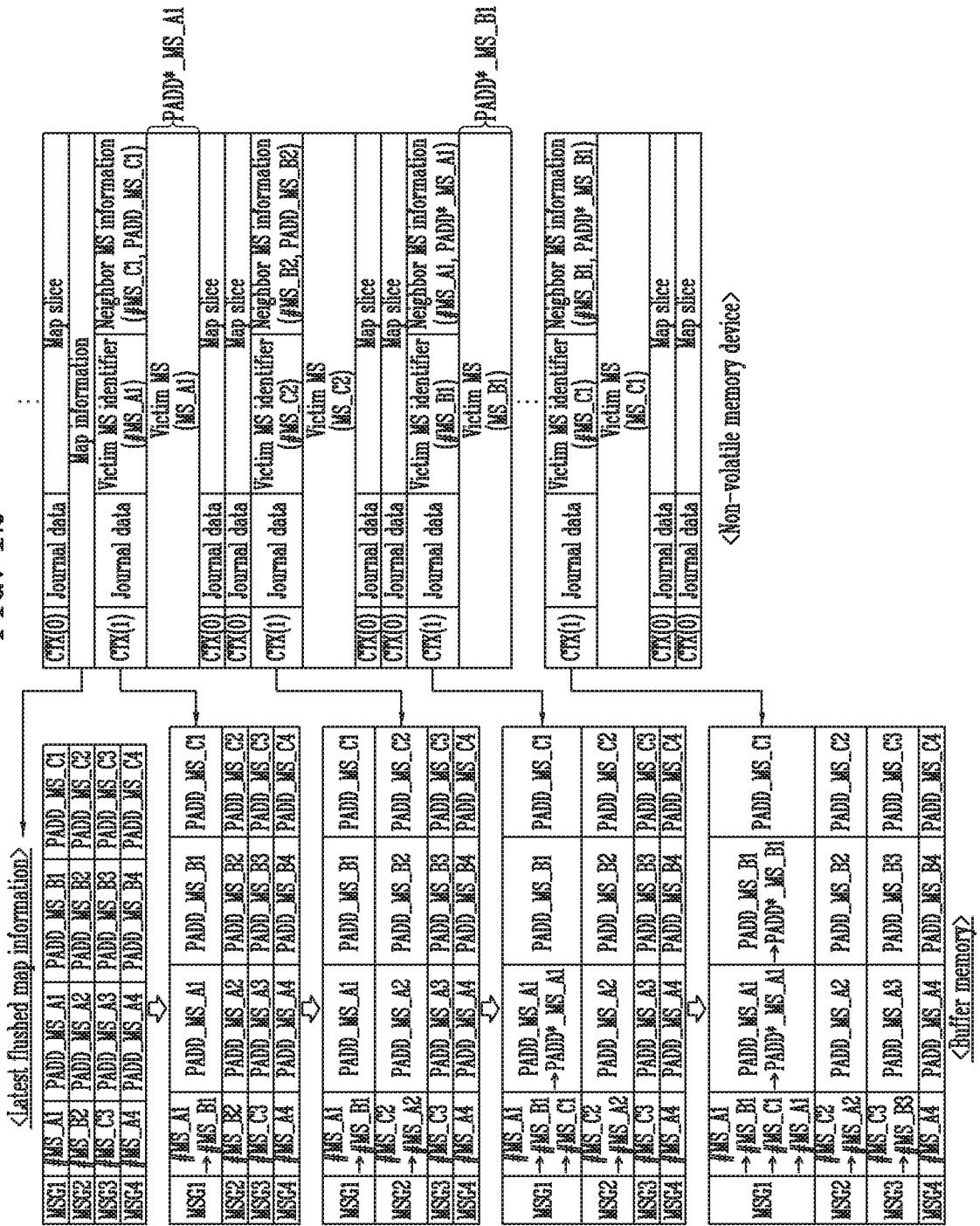
FIG. 12 is a diagram illustrating a process of rebuilding map information in accordance with an embodiment of the present disclosure.

FIG. 12 is a diagram illustrating a process of rebuilding map information in accordance with an embodiment of the present disclosure.

In power-on of the memory system, latest flushed map information among data flushed to the non-volatile memory device may be loaded into the buffer memory 2150.

When the latest flushed map information 2152 is loaded into the buffer memory 2150, flush data including a victim map segment flushed after the latest flushed map information 2152 is flushed at the time of the power-off may be searched. The flush data including the victim map segment may be searched with reference to the context information CTX. For example, flush data including the context information CTX set to '1' may be searched as the flush data including the victim map segment.

While all flush data including the victim map segment among the data flushed after the latest flushed map information 2152 are being sequentially searched, information included in the searched flush data may be reflected, so that the map information is rebuilt.

For example, a map segment loaded into the buffer memory 2150 just after the flush data including the victim map segment is flushed may be identified, based on at least one of a victim map segment (MS) identifier (i.e., #MS_A1 of flush data in FIG. 10) or neighbor map segment (MS) information (i.e., #MS_C1, PADD_MS_C1 of flush data in FIG. 10) included in the flush data including the victim map segment (i.e., MS_A1 of flush data in FIG. 10). For example, when the victim map segment identifier is #MS_A1 and the neighbor map segment information is #MS_C1, the map segment loaded into the buffer memory 2150 may be identified as #MS_B1. Therefore, currently cached map segment identification information corresponding to the map segment group MSG1 in the map information may be corrected from #MS_A1 to #MS_B1.

In addition, a physical address corresponding to the neighbor map segment in the neighbor map segment information included in the flush data including the victim map segment may be reflected to the map information. For example, when the map information loaded into the buffer memory 2150 represents that the physical address corresponding to a map segment MS_A1 is PADD_MS_A1 and the map segment position information included in the map segment information represents PADD*_MS_A1, the map information loaded into the buffer memory 2150 may be corrected from PADD_MS_A1 to PADD*_MS_A1.

Figure 13:
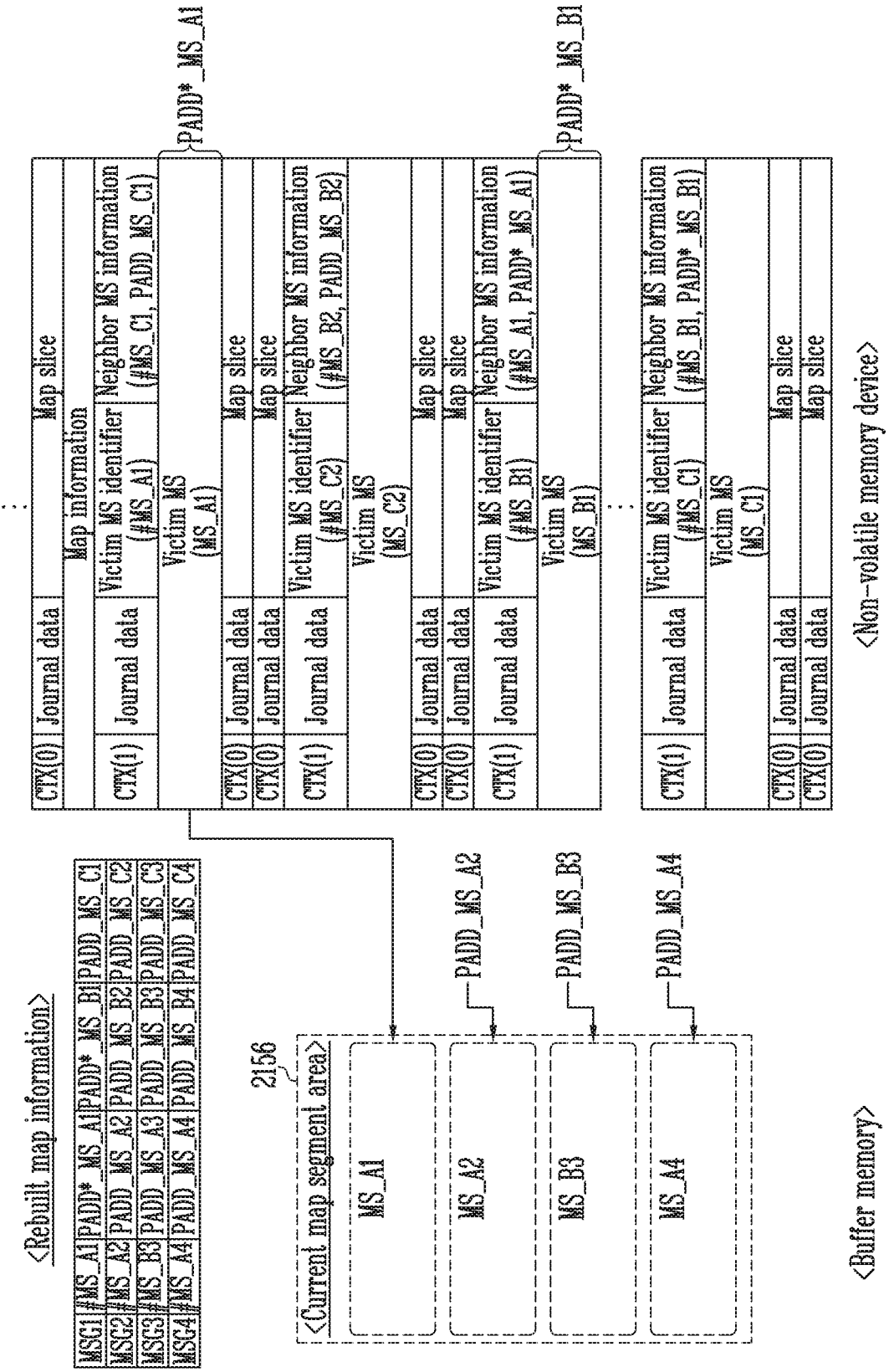
FIG. 13 is a diagram illustrating a process of loading a currently cached map segment in accordance with an embodiment of the present disclosure.

FIG. 13 is a diagram illustrating a process of loading a map segment upon the power-on in accordance with an embodiment of the present disclosure.

In the embodiment described with reference to FIG. 13, a case where the map information is rebuilt as described with reference to FIG. 12 is assumed.

When the map information is rebuilt, map segments corresponding to the currently cached map segment identification information 2152b included in the rebuilt map information may be loaded into the currently cached map segment area 2156. To this end, the map segment position information 2152c included in the rebuilt map information may be referred. That is, a storage area corresponding to the physical address included in the map segment position information 2152c is accessed, so that the map segments corresponding to the currently cached map segment identification information are loaded into the currently cached map segment area 2156.

In FIG. 13, an example in which the physical address PADD*_MS_A1 is accessed, so that the map segment MS_A1 corresponding to #MS_A1 is loaded, is illustrated.

In the same principle, physical addresses PADD_MS_A2 are accessed, so that the map segment MS_A2 is loaded. Physical addresses PADD_MS_B3 are accessed, so that the map segment MS_B3 is loaded. Physical addresses PADD_MS_A4 are accessed, so that the map segment MS_A4 is loaded.

Figure 14:
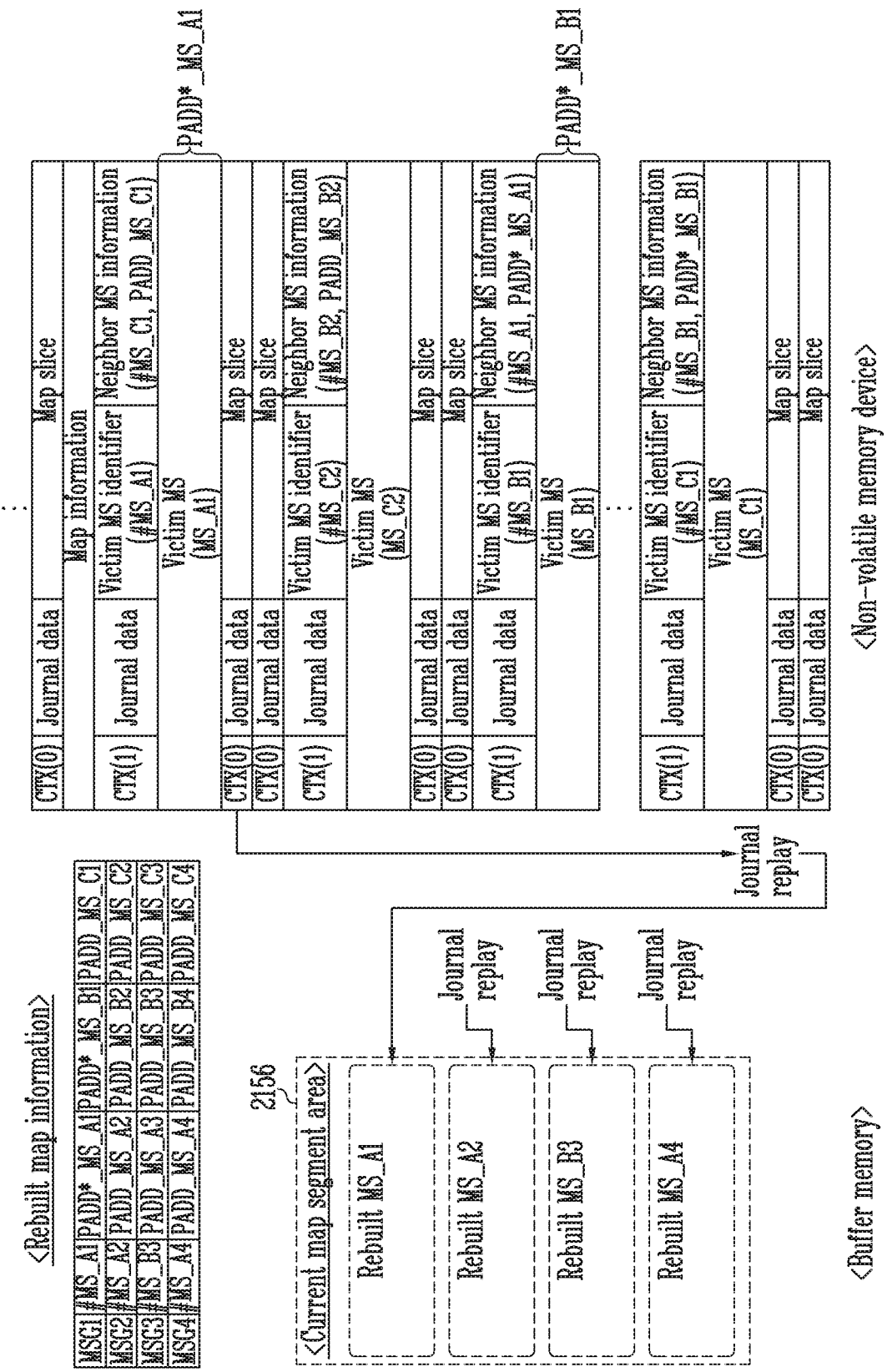
FIG. 14 is a diagram illustrating a process of rebuilding a currently cached map segment in accordance with an embodiment of the present disclosure.

FIG. 14 is a diagram illustrating a process of rebuilding a currently cached map segment in accordance with an embodiment of the present disclosure.

In the embodiment described with reference to FIG. 14, a currently cached map segment is loaded as described with reference to FIG. 13.

When a currently cached map segment is loaded into the currently cached map segment area 2156, a journal replay operation may be performed while journal data, flushed after the corresponding currently cached map segment is flushed to the non-volatile memory device, are being sequentially loaded.

For example, the currently cached map segment MS_A1 may be rebuilt while journal data included in flush data flushed after the currently cached map segment MS_A1 is flushed are being replayed in the order in which the journal data is flushed.

According to the same principle, the currently cached map segment MS_A2 may be rebuilt while journal data included in flush data flushed after the currently cached map segment MS_A2 is flushed are being replayed in the order in which the journal data is flushed. The journal replay operation may be performed on the currently cached map segments MS_B3 and MS_A4 in the same principle.

When the journal replay operation is completed, map segments may be rebuilt to the currently cached map segments at the time of the power-off of the memory system in the currently cached map segment area 2156 of the buffer memory 2150.

In an embodiment, the map segments rebuilt in the currently cached map segment area 2156 may be loaded into the host memory 1050c shown in FIG. 3.

Figure 15:
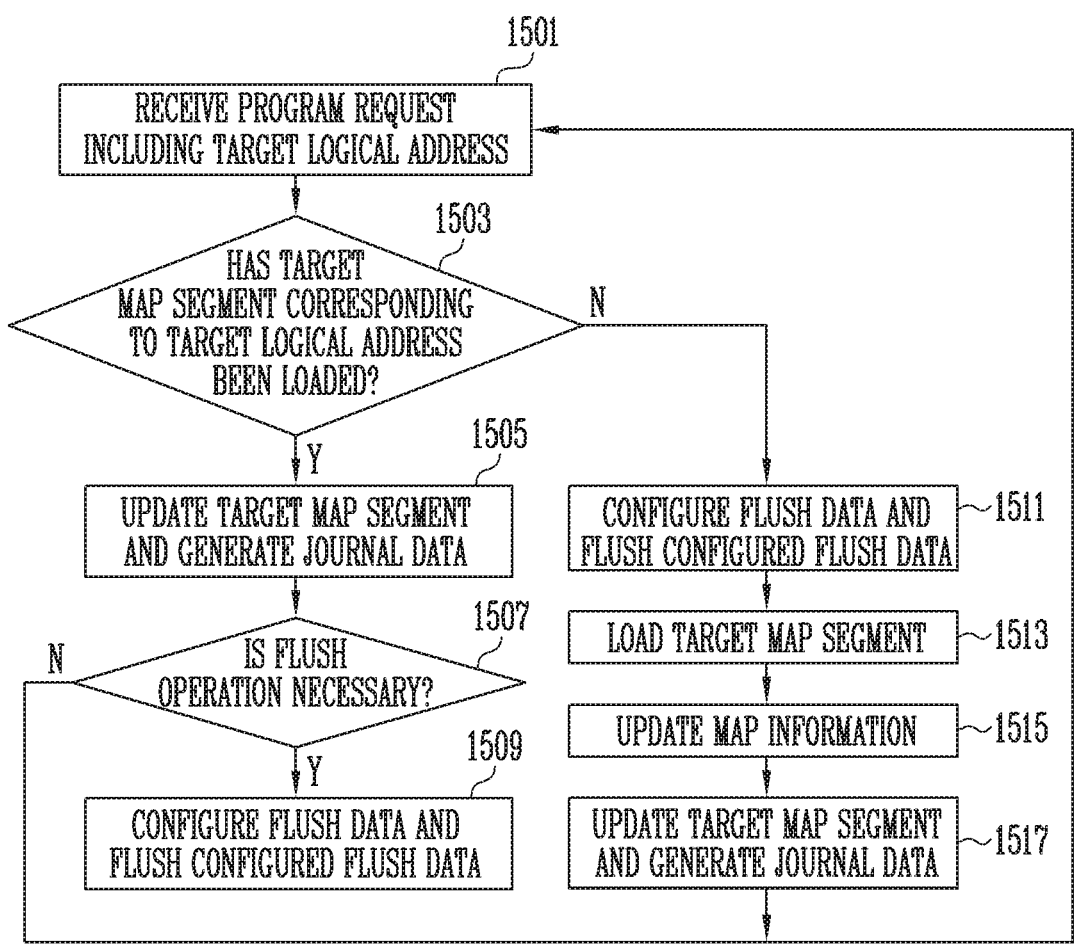
FIG. 15 is a flowchart illustrating an operating method of a memory controller in accordance with an embodiment of the present disclosure.

FIG. 15 is a flowchart illustrating an operating method of a memory controller in accordance with an embodiment of the present disclosure.

In step 1501, the memory controller (2100a shown in FIG. 1, 2100b shown in FIG. 2, or 2100c shown in FIG. 3) may receive a program request including a target logical address.

In step 1503, the memory controller may determine whether a target map segment corresponding to the target logical address has been loaded into the buffer memory. When it is determined that the target map segment corresponding to the target logical address has been loaded into the buffer memory, step 1505 may be performed. When it is determined that the target map segment corresponding to the target logical address has not been loaded into the buffer memory, step 1511 may be performed.

In the step 1505, the memory controller may allocate a physical address corresponding to the target logical address, and update the target map segment according to the allocated physical address. The memory controller may generate journal data representing an updated item.

In step 1507, the memory controller may check whether a flush operation is necessary. For example, the memory controller may determine that the flush operation is necessary, when the number of journal data generated corresponds to a set number or when the flush operation is performed a set number of times. When it is determined that the flush operation is necessary (Y at 1507), step 1509 may be performed. When it is determined that the flush operation is not necessary (N at 1507), step 1501 may be performed.

In step 1509, the memory controller may configure flush data, and flush the configured flush data to the non-volatile memory device. When the number of journal data generated corresponds to the set number, the memory controller may configure flush data including at least one of context information, journal data, or a map slice. When the flush operation is performed the set number of times, the memory controller may configure, as the flush data, map information managed in the buffer memory.

Meanwhile, in step S1511, which is performed when it is determined that the target map segment corresponding to the target logical address has not been loaded into the buffer memory, the memory controller may configure flush data, and flush the configured flush data to the non-volatile memory device. Wherein, the memory controller may configure flush data including at least one of context information, journal data, victim map segment identifier (i.e., #MS_A1 of flush data in FIG. 10), neighbor map segment information (i.e., #MS_C1, PADD_MS_C1 of flush data in FIG. 10), or a victim map segment.

In step 1513, the memory controller may load the target map segment into the buffer memory.

In step 1515, the memory controller may update the map information. For example, the memory controller may reflect, to the map information, a physical address corresponding to a storage area in which the victim map segment is flushed. Also, the memory controller may reflect identification information of the target map segment loaded into the buffer memory to currently cached map segment identification information 2152b.

In step 1517, the memory controller may allocate a physical address corresponding to the target logical address, and update the target map segment according to the allocated physical address. The memory controller may generate journal data including an updated item of the target map segment.

Figure 16:
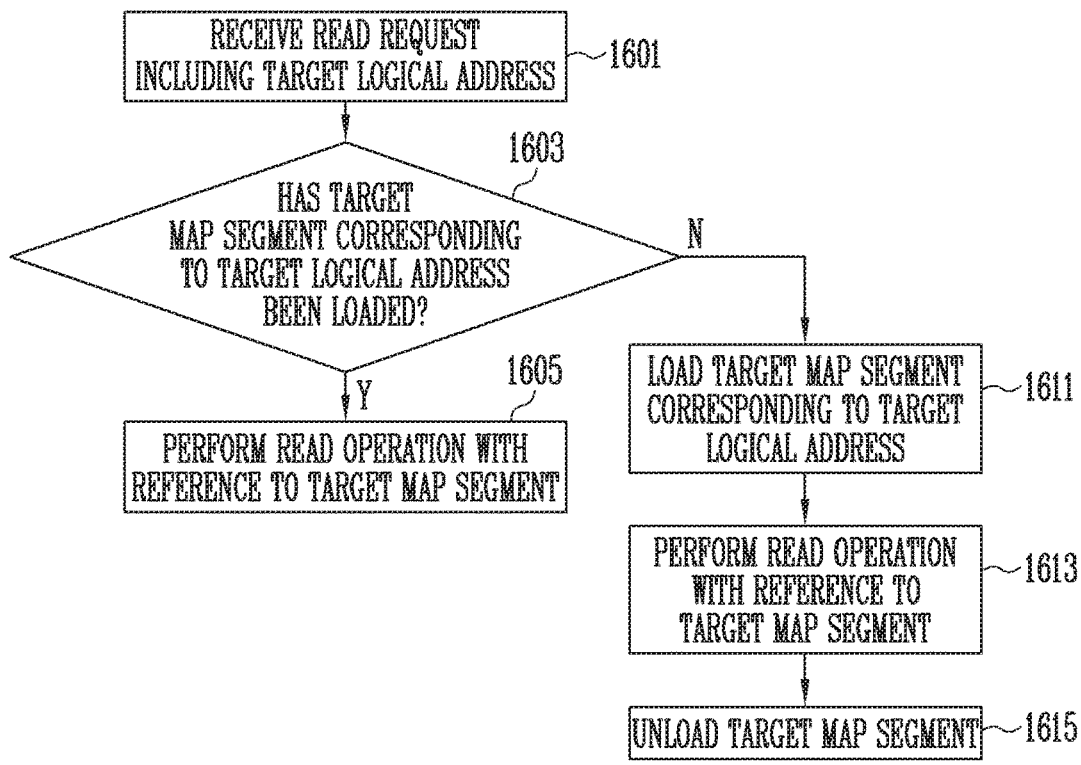
FIG. 16 is a flowchart illustrating an operating method of a memory controller in accordance with an embodiment of the present disclosure.

FIG. 16 is a flowchart illustrating an operating method of a memory controller in accordance with an embodiment of the present disclosure.

In step 1601, the memory controller (2100a shown in FIG. 1, 2100b shown in FIG. 2, or 2100c shown in FIG. 3) may receive a read request including a target logical address.

In step 1603, the memory controller may determine whether a target map segment corresponding to the target logical address has been loaded into the buffer memory. When it is determined that the target map segment corresponding to the target logical address has been loaded into the buffer memory (Y at 1603), step 1605 may be performed. When it is determined that the target map segment corresponding to the target logical address has not been loaded into the buffer memory (N at 1603), step 1611 may be performed.

In step 1605, the memory controller may identify a physical address corresponding to the target logical address with reference to the target map segment, and perform a read operation on a storage area corresponding to the identified physical address.

Meanwhile, in step 1611, which is performed when it is determined that the target map segment corresponding to the target logical address has not been loaded into the buffer memory, the memory controller may load the target map segment corresponding to the target logical address into the buffer memory.

In an embodiment, the memory controller may select, as a victim map segment, a neighbor map segment of the target map segment among map segments loaded into the buffer memory, and load the target map segment into the buffer memory after the selected victim map segment is flushed to the non-volatile memory device.

In another embodiment, the memory controller does not flush a neighbor map segment of the target map segment among map segments loaded into the buffer memory to the non-volatile memory device, but may load the target map segment into the buffer memory.

In step 1613, the memory controller may identify a physical address corresponding to the target logical address with reference to the target map segment, and perform a read operation on a storage area corresponding to the identified physical address.

When the neighbor segment of the target map segment among the map segments loaded into the buffer memory is not flushed to the non-volatile memory device in the step 1611, step 1615 may be performed.

In step 1615, when a target logical address included in a subsequent read request is not included in the target map segment loaded in the step 1611, the memory controller may unload the corresponding target map segment from the buffer memory.

Figure 17:
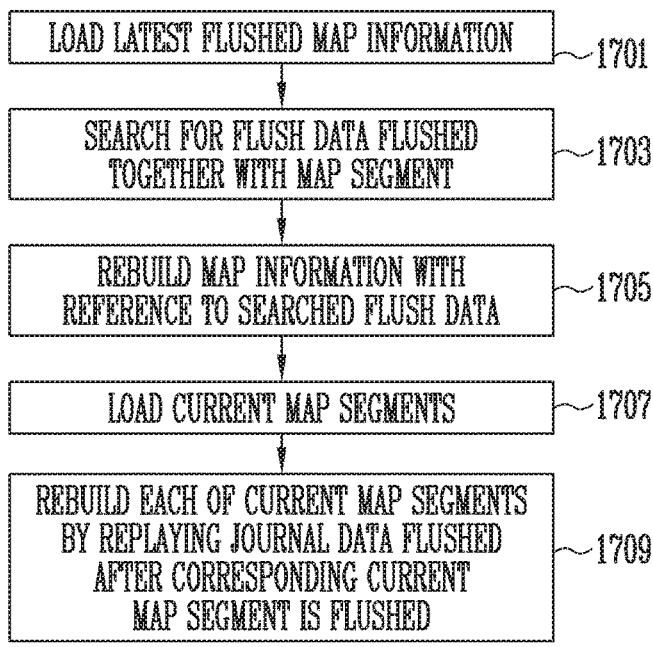
FIG. 17 is a flowchart illustrating an operating method of a memory controller in accordance with an embodiment of the present disclosure.

FIG. 17 is a flowchart illustrating an operating method of a memory controller in accordance with an embodiment of the present disclosure.

In step 1701, the memory controller (2100a shown in FIG. 1, 2100b shown in FIG. 2, or 2100c shown in FIG. 3) may identify latest flushed map information by searching storage areas of the non-volatile memory device, and load the identified map information into the buffer memory. The step 1701 may be performed at power-on of the memory system.

In step 1703, the memory controller may search for flush data flushed together with a map segment among flush data flushed after the latest flushed map information is flushed.

In step 1705, the memory controller may rebuild the map information loaded into the buffer memory with reference to the searched flush data. For example, the memory controller may rebuild the map information with reference to at least one of victim map segment identifier (i.e., #MS_A1 of flush data in FIG. 10) or neighbor map segment information (i.e., #MS_C1, PADD_MS_C1 of flush data in FIG. 10) included in the searched flush data.

In step 1707, the memory controller may load currently cached map segments into the buffer memory with reference to currently cached map segment identification information 2152b and map segment position information 2152c included in the rebuilt map information.

In step 1709, the memory controller may rebuild each of currently cached map segments loaded into the buffer memory by replaying journal data flushed after the corresponding currently cached map segment is flushed.

Figure 18:
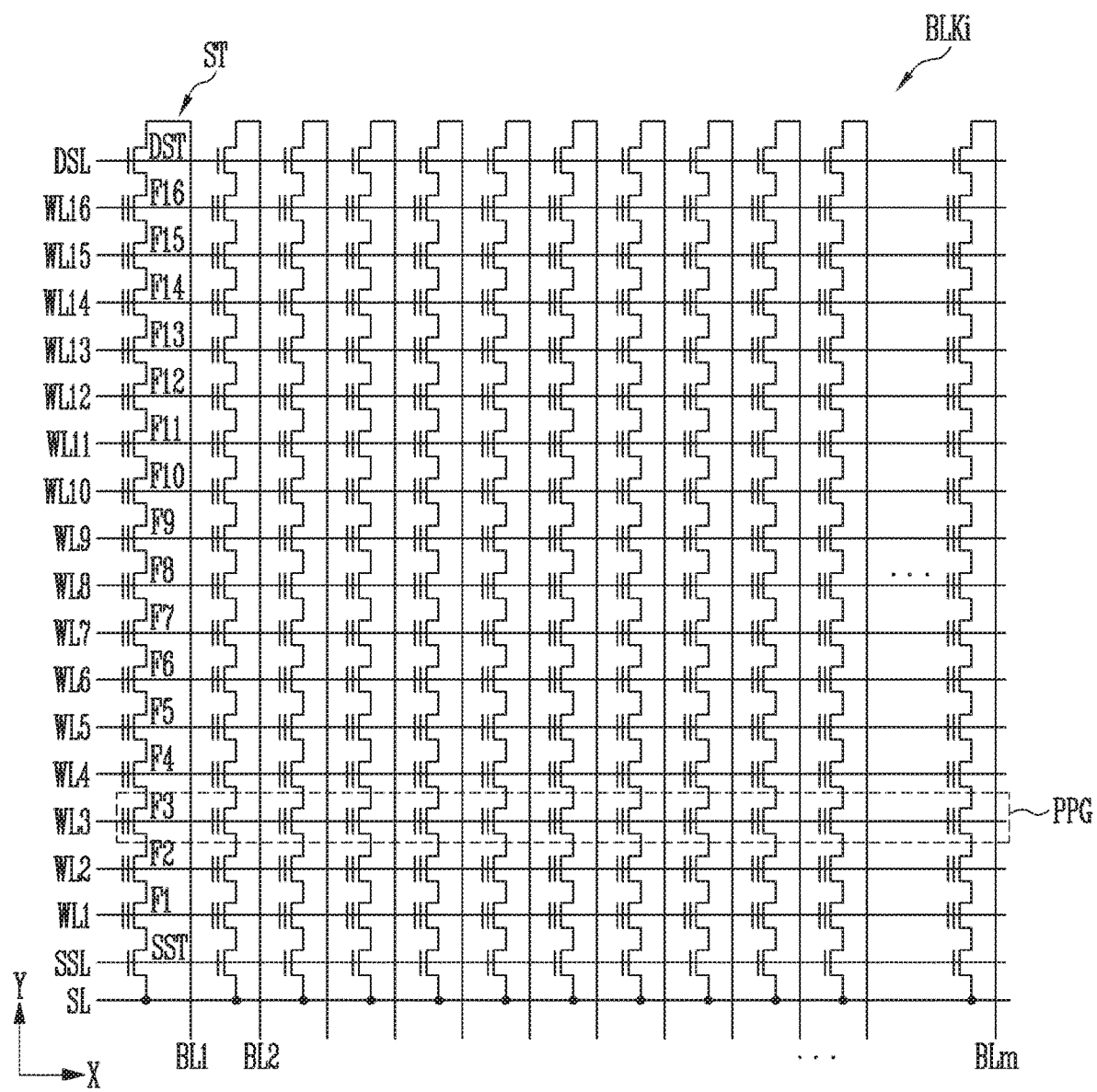
FIG. 18 is a diagram illustrating a memory block.

FIG. 18 is a diagram illustrating a memory block.

The memory cell array may include a plurality of memory blocks. A representative memory block BLKi among the plurality of memory blocks is illustrated in FIG. 18.

In the memory block BLKi, a plurality of word lines arranged in parallel to one another may be coupled between a first select line and a second select line. The first select line may be a source select line SSL, and the second select line may be a drain select line DSL. Specifically, the memory block BLKi may include a plurality of strings ST coupled between bit lines BL1 to BLm and a source line SL. The bit lines BL1 to BLm may be coupled to the strings ST, respectively, and the source line SL may be commonly coupled to the strings ST. The strings ST may be configured identically to one another, and therefore, a string ST coupled to a first bit line BL1 is described in detail as an example.

The string ST may include a source select transistor SST, a plurality of memory cells F1 to F16, and a drain select transistor DST, which are coupled in series between the source line SL and the first bit line BL1. At least one source select transistor SST and at least one drain select transistor DST may be included in one string ST, and more than 16 memory cells may be included in one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST included in different strings ST may be coupled to the source select line SSL, gates of drain select transistors DST included in different strings ST may be coupled to the drain select line DSL, and gates of the memory cells F1 to F16 in different strings ST may be coupled to the plurality of word lines WL1 to WL16. A group of memory cells coupled to the same word line among the memory cells in different strings ST may be referred as a physical page PPG. Therefore, physical pages PPG of which number corresponds to that of the word lines WL1 to WL16 may be included in the memory block BLKi.

One memory cell may store one bit of data. The memory cell may be referred to as a single level cell (SLC). Therefore, one physical page PPG may store one logical page (LPG) data. One LPG data may include data bits of which number corresponds to that of cells included in one physical page PPG. For example, when two or more bits of data are stored in one memory cell, one physical page PPG may store two or more logical pages LPG. For example, two LPG data may be stored in one physical page PPG in a memory device driven in an MLC type, and three LPG data may be stored in one physical page PPG in a memory device driven in a TLC type.

Figure 19:
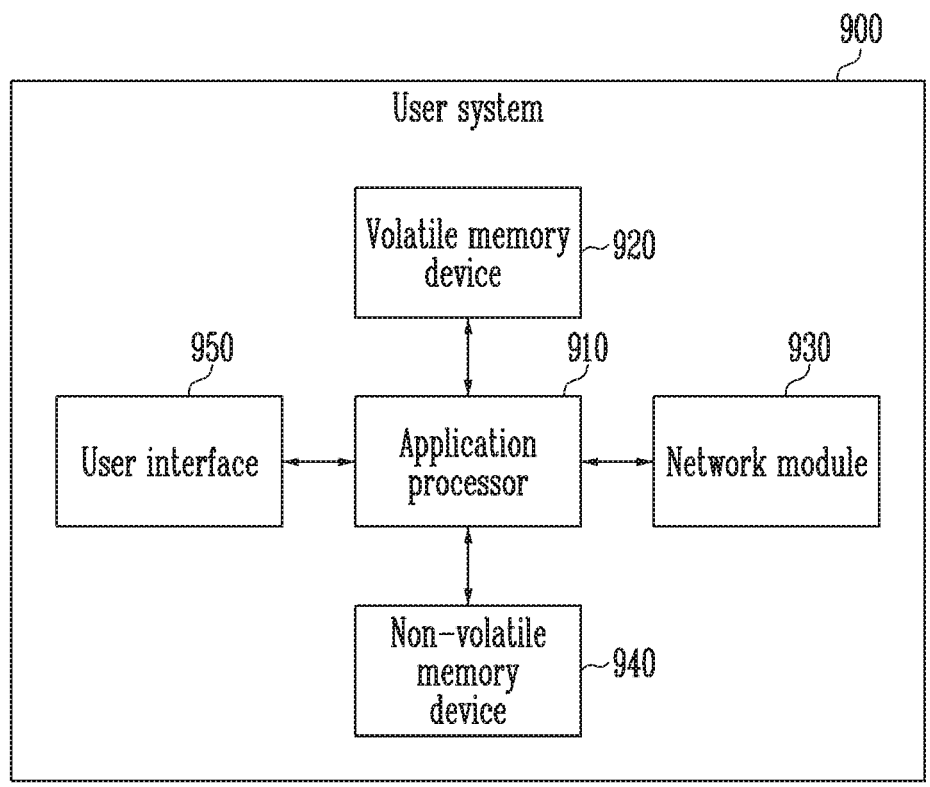
FIG. 19 is a diagram illustrating a memory system to which embodiments of the present disclosure are applied.

FIG. 19 is a diagram illustrating a memory system to which the embodiments of the present disclosure are applied.

The user system 900 may include an application processor 910, a volatile memory device 920, a network mobile 930, a non-volatile memory device 940, and a user interface 950.

The application processor 910 may drive at least one of various programs or an Operating System (OS) to control the user system 900. The application processor 910 may perform the same operation as the CPU 2130a shown in FIG. 1, the CPU 2130b shown in FIG. 2, or the CPU 2130c shown in FIG. 3.

The volatile memory device 920 may operate as a main memory, a working memory, a buffer memory or a cache memory, which is for an operation of the user system 900. The volatile memory device 920 may include a DRAM, an SRAM, or the like. The non-volatile memory device 920 may be identical to the buffer memory 2150a shown in FIG. 1, the buffer memory 2150b shown in FIG. 2, or the buffer memory 2150c shown in FIG. 3.

The network module 930 may perform communication with external devices. For example, the network module 930 may perform communication with external devices by using at least one of code division multiple access (CDMA), global system for mobile communication (GSM), wideband CDMA (WCDMA), CDMA-2000, time division multiple access (TDMA), or long term evolution (LTE).

The non-volatile memory device 940 may store data. For example, the non-volatile memory device 940 may store data received from the application processor 910 or transmit stored data to the application processor 910. The non-volatile memory device 940 may be provided as a detachable storage medium such as a memory card or an external drive. The non-volatile memory device 940 may be to the same or functionally the same as the non-volatile memory device 2200a shown in FIG. 1, the non-volatile memory device 2200b shown in FIG. 2, or the non-volatile memory device 2200c shown in FIG. 3.

The user interface 950 may receive data from a user or output data to the user. For example, the user interface 950 may include a keyboard, a keypad, a button, a touch screen, a camera, a microphone, a speaker, and the like.

In accordance with embodiments of the present disclosure, large-capacity meta data is efficiently managed with a small memory capacity.

While various embodiments have been illustrated and described in some detail for purposes of clarity and understanding, the present invention is not limited to any particular embodiment nor any specific details. As those skilled in the art will appreciate in light of the present disclosure, there are alternative ways of implementing the invention. The disclosed embodiments are thus illustrative, not restrictive. The present invention encompasses all variations and modifications that fall within the scope of the claims and their equivalents.

What is claimed is:

1. A memory system comprising:
   a non-volatile memory device configured to store a plurality of map segment groups each including map segments including mapping information between at least one physical address and at least one logical address of a host; and
   a controller configured to:
   load one map segment from each of selected map segment groups among the plurality of map segment groups, and
   differently configure flush data to be flushed to the non-volatile memory device in response to a program request that includes a first target logical address received from the host according to whether a target map segment corresponding to the first target logical address is in the loaded one map segment.

2. The memory system of claim 1, further comprising a temporary memory device configured to store the one map segment.

3. The memory system of claim 1, wherein the controller includes a temporary memory device configured to store the one map segment.

4. The memory system of claim 1, wherein the controller is configured to load the one map segment and store the loaded one map segments in a temporary memory area of the host.

5. The memory system of claim 1, wherein, when the target map segment exists in the loaded one map segment, the controller is configured to:
   update a physical address corresponding to the first target logical address within the target map segment, and
   configure the flush data to include journal data indicating the update of the target map segment.

6. The memory system of claim 5, wherein the controller is configured to, when a set number of journal data are generated, flush the generated journal data to the non-volatile memory device.

7. The memory system of claim 1, wherein the controller is configured to, when the target map segment is not the loaded one map segment:
   select, as a victim map segment, a neighbor map segment of the same map segment group as the target map segment, and
   configure the flush data to include the selected victim map segment.

8. The memory system of claim 7, wherein the controller is further configured to load map information Including a physical address of each of the map segments stored in the non-volatile memory device.

9. The memory system of claim 8, wherein the controller is configured to configure the flush data to include the physical address of the map information, which corresponds to each of remaining map segments, excluding the target map segment and the victim map segment, in the same map segment group.

10. The memory system of claim 8, wherein the controller is configured to update, in the map information, a physical address corresponding to the victim map segment after the flush data including the victim map segment is flushed to the non-volatile memory device.

11. The memory system of claim 8, wherein the controller is configured to load the target map segment after the flush data including the victim map segment is flushed to the non-volatile memory device.

12. The memory system of claim 11, wherein the controller is configured to:
update the physical address corresponding to the first target logical address in the loaded target map segment, and
configure the flush data to include journal data indicating the update of the loaded target map segment.

13. The memory system of claim 1, wherein the controller is further configured to load, when a target map segment corresponding to a second target logical address received from the host is not the loaded one map segment, the target map segment corresponding to the second target logical address in response to a first read request including the second target logical address.

14. The memory system of claim 13, wherein, after the target map segment corresponding to the second target logical address is loaded, the controller is configured to unload, when a third target logical address does not correspond to the target map segment corresponding to the second target logical address, the target map segment corresponding to the second target logical address in response to a second read request including the third target logical address, which is received from the host.

15. A memory system comprising:
a non-volatile memory device, into which map information and flush data are flushed, the map information including a physical address at which each of a plurality of map segments in each of a plurality of map segment groups is stored in the non-volatile memory device, and the flush data including a physical address at which a first map segment among the map segments is flushed; and
a controller configured to:
load the map information,
load the flush data flushed after the map information is flushed, and
update the physical address, at which the first map segment in the loaded flush data is stored, in the loaded map information.

16. The memory system of claim 15, further comprising a temporary memory device configured to store the loaded map information and the loaded flush data.

17. The memory system of claim 15, wherein the controller includes a temporary memory device configured to store the loaded map information and the loaded flush data.

18. The memory system of claim 15,
wherein the loaded flush data further include identification information of a second map segment of the same map segment group as the first map segment among the map segment groups,
wherein the controller configured to include the identification information of the second map segment in the loaded map information.

19. The memory system of claim 18, wherein the controller is further configured to load the second map segment corresponding to the identification information of the second map segment.

20. The memory system of claim 19, wherein:
the non-volatile memory device is further configured to store journal data corresponding to at least one of the map segments, and
the controller is further configured to load journal data flushed after the second map segment is flushed, among journal data stored in the non-volatile memory device, and update the loaded second map segment by replaying the loaded journal data.

* * * * *